United States Patent
Haugsnes

(10) Patent No.: US 10,225,288 B2
(45) Date of Patent: Mar. 5, 2019

(54) SCALABLE NETWORK SECURITY DETECTION AND PREVENTION PLATFORM

(71) Applicant: ServiceNow, Inc., Santa Clara, CA (US)

(72) Inventor: Andreas Seip Haugsnes, Mountain View, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/002,655

(22) Filed: Jan. 21, 2016

(65) Prior Publication Data

US 2016/0269427 A1  Sep. 15, 2016

Related U.S. Application Data

(63) Continuation of application No. 13/556,524, filed on Jul. 24, 2012, now abandoned.

(Continued)

(51) Int. Cl.
*H04W 12/12* (2009.01)
*H04L 29/06* (2006.01)
(Continued)

(52) U.S. Cl.
CPC ........ *H04L 63/205* (2013.01); *G06F 9/45558* (2013.01); *G06F 17/30345* (2013.01); *G06F 17/30424* (2013.01); *G06F 17/30864* (2013.01); *G06F 21/552* (2013.01); *H04L 63/0281* (2013.01); *H04L 63/145* (2013.01); *H04L 63/1416* (2013.01); *H04L 63/1425* (2013.01); *H04L 63/1441* (2013.01); *H04L 67/1097* (2013.01); *H04W 12/12* (2013.01); *G06F 2009/45587* (2013.01); *H04L 63/02* (2013.01); *H04L 63/1433* (2013.01)

(58) Field of Classification Search
USPC .......... 726/12, 2, 21, 36; 713/150, 163, 181; 380/255, 264, 276
See application file for complete search history.

(56) References Cited

U.S. PATENT DOCUMENTS 6,848,015 B2   1/2005   Jones
7,010,696 B1   3/2006   Cambridge et al.
(Continued)

*Primary Examiner* — Sharif E Ullah
(74) *Attorney, Agent, or Firm* — Fletcher Yoder, P.C.

(57) ABSTRACT

This disclosure provides a network security architecture that permits installation of different software security products as virtual machines (VMs). By relying on a common data format and standardized communication structure (e.g., using pre-established, cross-platform messaging), a general architecture can be created and used to dynamically build and reconfigure interaction between both similar and dissimilar security products. Examples are provided where an intrusion monitoring system (IMS) can be used to detect network threats based on distributed threat analytics, passing detected threats to other security products (e.g., products with different capabilities from different vendors) to trigger automatic, dynamically configured communication and reaction. A network security provider using this infrastructure can provide hosted or managed boundary security to a diverse set of clients, each on a customized basis.

21 Claims, 12 Drawing Sheets

Related U.S. Application Data

(60) Provisional application No. 61/593,853, filed on Feb. 1, 2012.

(51) Int. Cl.
  *G06F 21/55* (2013.01)
  *G06F 17/30* (2006.01)
  *H04L 29/08* (2006.01)
  *G06F 9/455* (2018.01)

(56) References Cited

U.S. PATENT DOCUMENTS

| | | | |
|---|---|---|---|
| 7,076,801 B2* | 7/2006 | Gong | H04L 63/0281 726/11 |
| 7,100,195 B1* | 8/2006 | Underwood | G06F 9/451 726/2 |
| 7,603,711 B2 | 10/2009 | Scheidell | |
| 7,644,365 B2 | 1/2010 | Bhattacharya et al. | |
| 8,239,668 B1 | 8/2012 | Chen et al. | |
| 8,321,944 B1 | 11/2012 | Mayer et al. | |
| 8,914,406 B1 | 12/2014 | Haugsnes et al. | |
| 9,038,183 B1 | 5/2015 | Haugsnes et al. | |
| 9,137,258 B2 | 9/2015 | Haugsnes | |
| 9,167,001 B1 | 10/2015 | Haugsnes et al. | |
| 2003/0105911 A1 | 6/2003 | Jones | |
| 2003/0133443 A1* | 7/2003 | Klinker | H04L 29/06 370/353 |
| 2003/0154399 A1* | 8/2003 | Zuk | H04L 63/0254 726/11 |
| 2004/0221191 A1* | 11/2004 | Porras | H04L 41/142 714/4.4 |
| 2005/0097256 A1 | 5/2005 | Jones | |
| 2005/0193429 A1* | 9/2005 | Demopoulos | G06F 21/552 726/23 |
| 2006/0031476 A1* | 2/2006 | Mathes | H04L 41/0886 709/224 |
| 2007/0214220 A1 | 9/2007 | Alsop et al. | |
| 2007/0261112 A1 | 11/2007 | Todd et al. | |
| 2008/0034425 A1 | 2/2008 | Overcash et al. | |
| 2008/0162474 A1 | 7/2008 | Thong et al. | |
| 2008/0276098 A1 | 11/2008 | Florencio et al. | |
| 2009/0210424 A1 | 8/2009 | Morohoshi | |
| 2009/0210427 A1* | 8/2009 | Eidler | G06F 11/1484 |
| 2009/0328209 A1 | 12/2009 | Nachenberg | |
| 2010/0114701 A1 | 5/2010 | Steelberg et al. | |
| 2010/0175132 A1 | 7/2010 | Zawadowskiy et al. | |
| 2011/0023119 A1 | 1/2011 | Rayes et al. | |
| 2012/0109802 A1 | 5/2012 | Griffin et al. | |
| 2012/0117509 A1 | 5/2012 | Powell et al. | |
| 2012/0159624 A1 | 6/2012 | Konig | |
| 2012/0328215 A1 | 12/2012 | Thong et al. | |
| 2013/0007870 A1 | 1/2013 | Devarajan et al. | |
| 2013/0060810 A1 | 3/2013 | Maman et al. | |
| 2013/0247193 A1 | 9/2013 | Zaitsev | |
| 2014/0032306 A1 | 1/2014 | Sukornyk et al. | |
| 2014/0172495 A1 | 6/2014 | Schneck et al. | |
| 2014/0189873 A1 | 7/2014 | Elder et al. | |
| 2015/0012339 A1 | 1/2015 | Dnischuk | |
| 2015/0156213 A1 | 6/2015 | Baker | |
| 2015/0207813 A1 | 7/2015 | Reybok et al. | |
| 2016/0164890 A1 | 6/2016 | Haugsnes | |

* cited by examiner

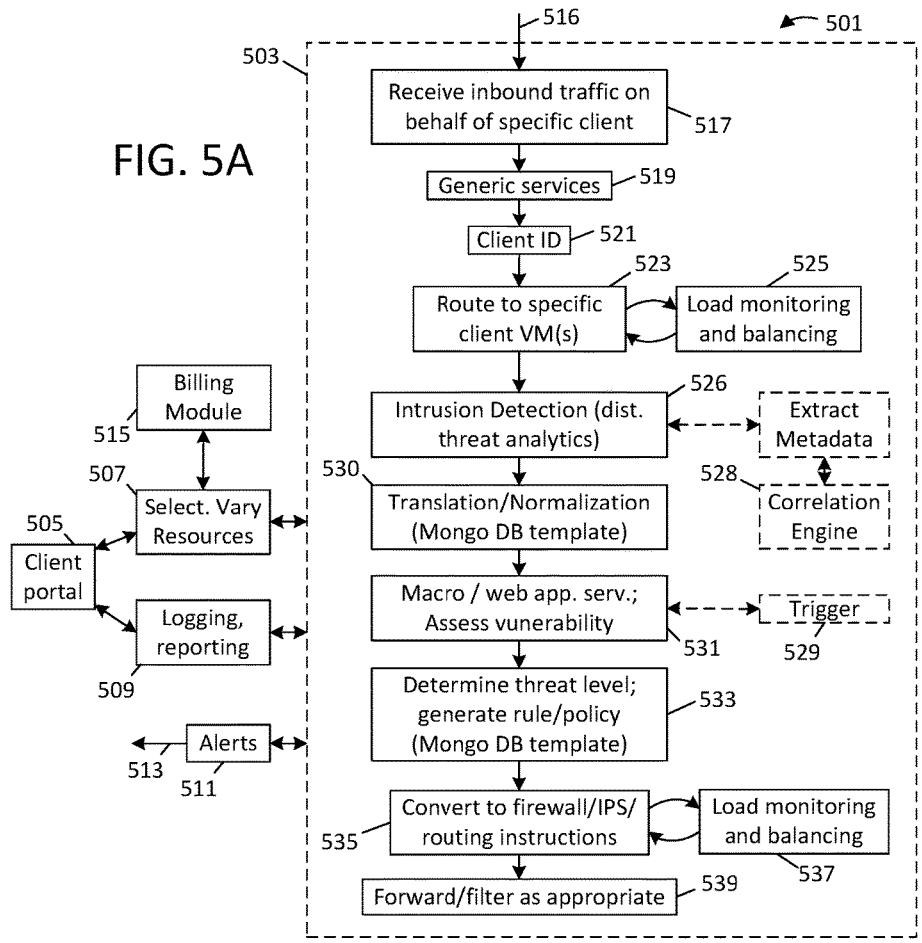

FIG. 6C
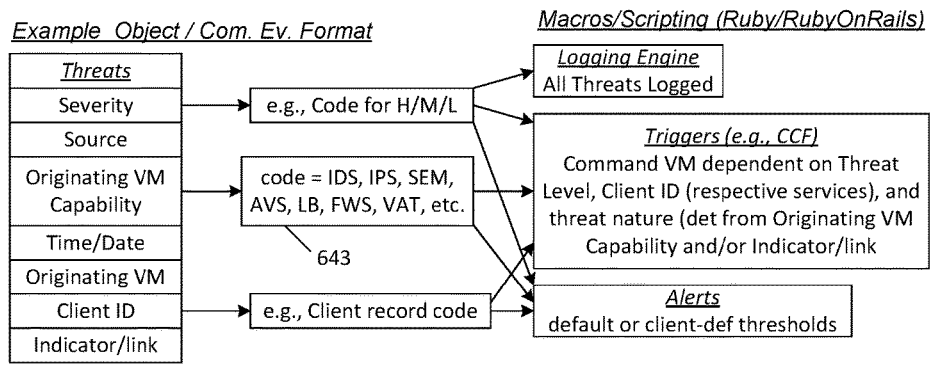
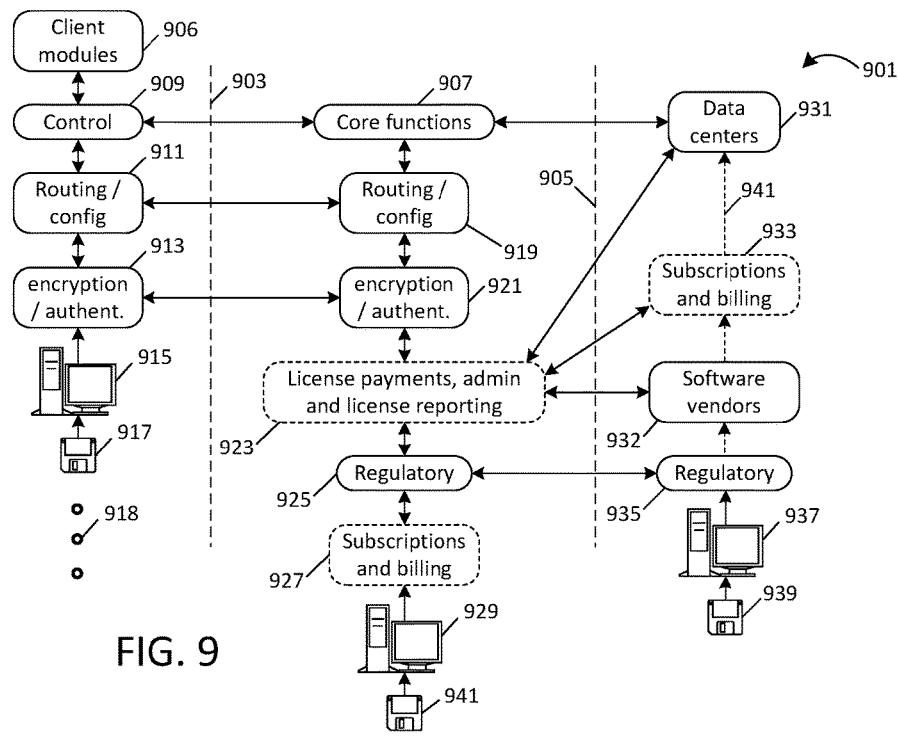
FIG. 9

SCALABLE NETWORK SECURITY DETECTION AND PREVENTION PLATFORM

This application is a continuation of U.S. patent application Ser. No. 13/556,524, filed Jul. 24, 2012 on behalf of inventor Andreas Haugsnes for "SCALABLE NETWORK SECURITY DETECTION AND PREVENTION PLATFORM;" U.S. patent application Ser. No. 13/556,524 in turn claims priority to U.S. Provisional Application No. 61/593,853, filed Feb. 1, 2012 on behalf of inventor Andreas Haugsnes, and entitled "SCALABLE NETWORK SECURITY DETECTION AND PREVENTION PLATFORM." The foregoing patent applications are hereby incorporated by reference.

BACKGROUND

Fueled by recent advances in computer technology, an ever increasing number of companies and other enterprises continue to move to increasingly-electronic environments. It is not uncommon for a typical employee, for example, to have full network and Internet connectivity and software application capabilities at a remote laptop, smart phone or other portable device. Yet increasing reliance on these machines, particularly in the enterprise context, has led to unprecedented network security challenges.

Enterprises are especially at risk to directed attacks that attempt to overwhelm services, discover passwords and other valuable information, and otherwise misuse private network resources. The difficulty in detecting and mitigating these attacks is especially challenging when one considers the ever increasing use of the remote work place, and other cross-business "trusted" network connections that make it difficult to maintain a defined and pervasive "firewall" at network boundaries.

Various techniques have evolved in part to cope with these challenges. An enterprise having a private network can select from an ever increasing number of disparate products offered by different software vendors. While generally useful for their intended purposes, these systems require specialized training by dedicated personal for proper interpretation, deployment and maintenance; these systems are usually also incrementally added based on dynamic need, creating a hodge-podge of different systems, rather than leading to an efficient architecture that takes a client's current (and possibly dynamic) needs into account. Furthermore, one vendor's systems are typically incompatible with those of another vendor, leading to suboptimal solutions where a client must typically select a single vendor by balancing both advantages and disadvantages of the products of one vendor against another. Managed services have also arisen where the enterprise can contract a third party company to provide network management services, where the third party company remotely interfaces with the enterprise's security equipment or has personnel stationed on the enterprise's site to manage that security equipment; while generally beneficial to companies wishing to outsource IT security management, these solutions do little to address the vendor integration and custom architecture problems described above.

BRIEF DESCRIPTION OF THE DRAWINGS

FIG. 5A shows a typical client implementation 501 using a hosted security service; the hosted security service provides intrusion monitoring based on distributed threat analytics and associated reactive capabilities.

FIG. 5B shows a layer model 551 to illustrate an exemplary software architecture for a security service that permits dynamic selection and deselection of different security services; in particular, respective layers include machine layer 553, application software layer 555, the use of objects and templates 557 to provide a common communication format 560, and associated scripting and web applications 559.

FIG. 6C provides another illustrative diagram 641, used to explain how templates (or objects) can be employed with scripting to generate reactive capability to detected intrusion or to other events.

FIG. 9 provides an illustrative diagram used to explain different implementations and business models for administration of the various services, methods and techniques discussed herein.

Figure 1:
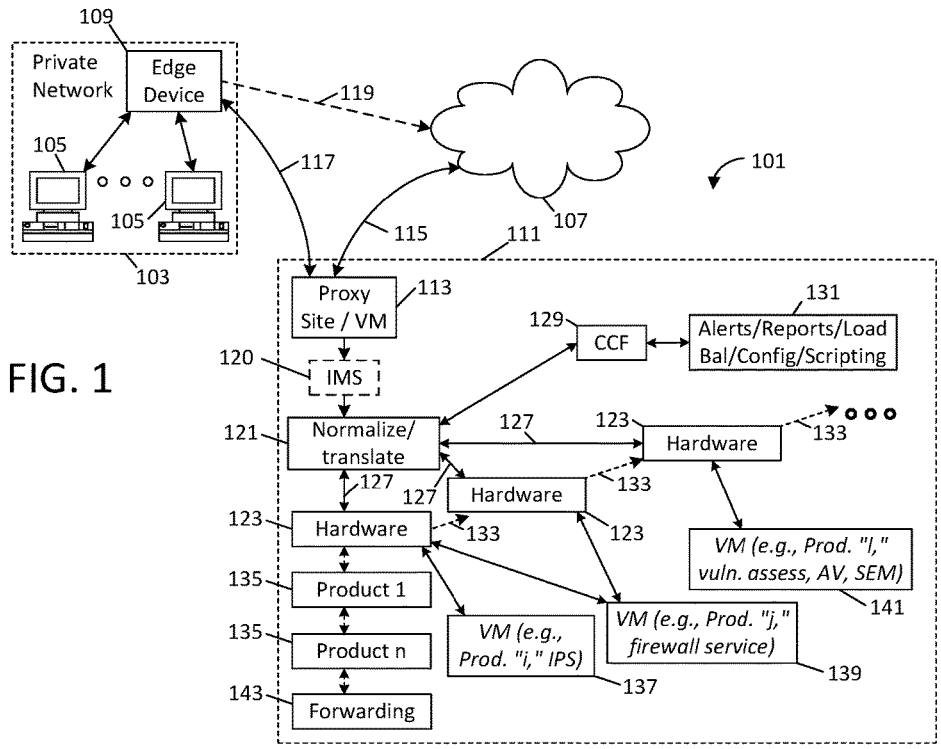
FIG. 1 provides an illustrative diagram 101 used to explain a security method and related embodiments.

The invention defined by the enumerated claims may be better understood by referring to the following detailed description, which should be read in conjunction with the accompanying drawings. This description of one or more particular embodiments, set out below to enable one to build and use various implementations of the invention or inventions set forth by the claims, is not intended to limit the enumerated claims, but to exemplify their application.

DETAILED DESCRIPTION

Introduction

The description set out below exemplifies (i) systems for providing network security (e.g., hosted by an enterprise or hosted for the enterprise by a third party), (ii) methods for providing network security (e.g., for one's own network or for a third party network), and (iii) other forms of devices an apparatuses (e.g., instructions stored on machine readable media, such as software performing the same or similar functions as these methods or systems, or which allows a software user to build or implement similar methods or systems). Generally speaking, these embodiments process inbound Internet traffic (including email, instant messaging, web browser access to web sites, media access, virtual drive access, file transfer, and other forms of wide area traffic) using a virtualization infrastructure that permits security software products from different suppliers to be mixed and matched, with translation and a common data format used for passing arguments between the software products, and otherwise dynamically building a custom security network. In a typical, specific application, a security network can be designed to perform intrusion monitoring using distributed threat analytics, and responsive to results of intrusion analysis, to automatically take one or more actions using one or more security products run as virtual machines, though a translation layer. The virtual environment, as mentioned, permits services to be added and subtracted dynamically, including new security software products from commercial vendors, potentially even in situations where those products are natively incompatible with one another; this environment also facilitates easy scaling of selected services. The common data format and scripting permits generation of an infrastructure where, notwithstanding which security software products are selected or deselected, in-place scripting and custom scripting are used to automatically invoke reactions to detected threats (that is, these reactions can be designed for example even before services are selected, as part of the general infrastructure). To provide several examples, a threat detected by the intrusion monitoring service (IMS) can be converted to a template or object with specific fields or attributes, and these fields or attributes can be used to invoke macros or scripts that then import the rules, threats or other data into virtual machines (VMs) which have been selected for use on behalf of a specific private network. This architecture facilitates an environment where additional rules and policies can be automatically created and dynamically applied, providing a new degree of scalability and flexibility in network security management. Perhaps otherwise stated, normalizing inputs and outputs of various security products in a virtual environment facilitates a framework where services can be dynamically added as desired, and where new security policies and rules and interactions between these products can be automatically and/or flexibly created and applied.

Note that in some specific embodiments discussed below (a) the intrusion monitoring service (IMS) or different or alternate IMS products from different software manufacturers can be implemented as virtual machines and optional services, (b) the methods can be implemented as a hosted security service to provide security to one private network or to an array of different clients' private networks (e.g., on a "service bureau" basis), each client having a different suite of custom-selected and dynamically-changeable services, and (c) the architectural platform discussed above can be implemented within a single enterprise, either as a custom or a commercial solution, or as software (i.e., instructions stored on machine readable media). Also, in each of these embodiments, scripting can take the form of one or more specific, predetermined message types transmitted across a security network. For example, detected events can be used to trigger requests for information, a notification of a detected event, or a request for a new configuration (e.g., for a new rule or policy, or a new VM). The first two of these action types can be broadcast to all VMs in the security network, whereas the last type of message is typically formatted as a specific function call to a specific destination to open up a new VM instance or to instantiate a specific rule or policy. By building these capabilities into existing proprietary security products, or implementing this functionality via an API, each security product can essentially be made to talk to other security products through a standardized interface, that permits exchange of detected events, requests for information, and calls for new or different services, all on a completely automated basis.

Note that these techniques permit dynamic interaction between VMs, prior to detecting results, in a manner that can improve reliability. Thus, using requests for information (e.g., an IDS querying another system whether captured metadata represents a threat), it is possible for an individual security product (i.e., VM in this implementation) to rank possible threats and apply processing dependent upon the reputation associated with each individual threat, all prior to reporting an event. By leveraging standardized deployments, these techniques empower existing security products to perform real time lookups prior to making a decision of the outcome. These techniques also enable significant reduction in the processing and logging of superfluous data, i.e., by enabling security products to emphasize only confirmed threats. More information on the use of inter-VM communications, such as requests for information, notifications and requests for new configurations, are provided in the "Vorstack Security Protocol" which is attached to this document as an appendix, and which is incorporated herein.

Prior to proceeding with the description, a few general terms used by this disclosure will be introduced. The terms "intrusion detection system" (IDS) and "intrusion monitoring system" (IMS) are generally used interchangeably, that is, to refer to a system that detects threats by monitoring wide area traffic, although not necessarily being able to block or otherwise remedy those threats. The "Internet" is used as a moniker for any wide area network (or "WAN"), i.e., security for world wide web (www) applications hosted by private network is a principle application of the techniques provided by this disclosure, but it should be understood that the teachings herein can be applied to any wide area network, including potentially applications such as Bluetooth, phone networks, semi-private and private networks and most other forms of wide area network that present unknown security risks—the term "Internet" is used both to refer to the world wide web as well as any of these forms of WANs. The term "cloud" refers to an unknown part of this WAN, with unknown or unspecific destinations and sources of traffic. A "private network" is any type of network or sub-network (subnet) where it is desired to provide security, and can include for example, a home network, the network of an enterprise or company, a governmental or institutional network (e.g., a university network) and so forth; the term "client network" should be understood to primary refer to a private network that is paying a third party for hosted security services, i.e., the "client" is the one paying for or otherwise receiving the benefit of security services to protect its network, and the third party possesses or manages security for the network of the client using techniques provided herein—the devices (e.g., computers, servers and routers) of the client represents the "client network" and the devices of the third party used to provide security represent the "security services network" or "hosted security network." Note that the "client network" can also encompass other third party networks, e.g., the networks of trusted business partners, customers of that client, contractors, semi-trusted networks of others (e.g., a foreign subsidiary of the client), and potentially other third parties. Finally, as alluded to earlier, "traffic" can include any form of messaging or communication over a "WAN," including packets, emails, instant messaging, secure transactions, web site accesses, telecommunications, media transfer, and many other forms of communication, whether encrypted or not.

General Structure

FIG. 1 is an illustrative diagram 101 used to explain a security method 101 and related embodiments. In particular, a private network 103 is seen at the left as including a number of computers 105 that seek access to web pages or otherwise to communicate (i.e., transmit or receive information) out-of-network; these machines may represent web sites or other applications of the private network that are to be remotely accessed by third parties. Such web pages and other out-of-network communications are graphically depicted by a cloud icon 107, to denote that their sources and/or destinations could be anywhere on the Internet or other form of a public wide area network (WAN). As is typical for private networks, both inbound and outbound communications are routed through an edge device 109, which serves as a border device (or collection of devices) for the private network 103 and which may also optionally provide security functions such as a network firewall and other services. For large networks (e.g., company networks), an administrator or network security team would conventionally manage security, for example, using software at the edge device 103 or at other network devices, on an ad hoc basis. To cite some examples, it would be conventional to provide some level of antivirus screening, source blocking, spam filtering, and perhaps content filtering (e.g., to screen offensive, copy-protected or otherwise inappropriate material), all typically implemented by custom, reactive programming by the administrator or security personnel. Note that although depicted as one "device," the edge device 109 represents potentially many machines and tools that cooperate together to provide data processing and forwarding including, for example, routers, load balancers, forwarders, exchange servers, and many other types of devices.

In accordance with the teachings of this disclosure, automated management is provided as a supplement or replacement to the manual and custom services indicated above, in part, by using a security architecture represented by dashed-line box 111 in FIG. 1. Note that this depicted service may optionally be implemented outside of the private network 103, that is, at a remote network, with Internet traffic inbound to the private network being instead directed to a proxy site 113 and only thereafter being farmed out within the private network, for example as represented by paths 115 and 117. In embodiments where this automated management is performed within the private network 103, it should be assumed that the functions within box 111 are integrated with the edge device 109 (again, which may consist of any number of network machines and associated components and tools) or otherwise within the private network.

More specifically, inbound Internet traffic is received at a proxy site 113 and is then processed by services implemented as one or more virtual machines (VMs). A virtual machine in this context should be viewed as software running on non-specific hardware platform, using an emulated instruction set as necessary or appropriate. Generally speaking, in the system of FIG. 1, each virtual machine will consist of a security software product of any vendor, with emulation software sufficient to run the security software product on nonspecific hardware. The security software products can include an intrusion monitoring system (IMS), also referred to sometimes as an intrusion detection system (IDS), a firewall system (FWS), an intrusion prevention system (IPS), a security event manager service (SEMS), an antivirus service (AVS), a vulnerability assessment tool (VAT) or any other form of security software product (e.g., for email or any other form of network traffic). Generally speaking, an IMS monitors traffic patterns using distributed threat analytics, meaning that packets or messages representing diverse communication (different sessions, users, or destinations) are analyzed to detect patterns representing a distributed network threat. If the IMS detects such a threat, for example, concentrated requests for access to a web page of the private network 103 from a single source or small group of sources (representing a possible denial of service attack), the IMS typically generates an alarm or other alert to indicate this fact.

Note that an IMS typically does not itself take mitigation action responsive to such an alarm, i.e., this is conventionally left up to the manual actions of a human network administrator. A FWS typically is positioned at or near the edge device and typically simply either blocks or allows individual messages according to pre-established rules or policies; for example, a FWS might reject traffic originating from a specific sender IP address. An IPS typically provides a more sophisticated form of filtering, for example, by routing or otherwise filtering traffic matching specific patterns; an IPS can take a number of different actions depending on rule and policy, for example, quarantining messages (e.g., emails with attachments), querying the source, routing traffic in a specific manner and so forth. A SEMS is typically a customized framework for coordinating multiple specific systems, and typically also manages alerts and archiving for the human administrator, based on relatively slow correlation across large amounts of historical data. An AVS typically filters individual messages for viruses or other malware. Finally, a VAT typically tests a specified system (e.g., a client system) to assess vulnerability to attacks, for example, by testing for system misconfiguration, application misconfiguration, application loading and response times, port errors and other forms of vulnerabilities. Note that many such products are available today from various manufacturers including Microsoft, Cisco, Juniper Networks, Symantec, and many other companies.

In the embodiment depicted in FIG. 1, it should be assumed that software products from these various manufacturers are run as virtual machines (VMs) with inputs and outputs translated to a common communication format (CCF) with common message types (mentioned earlier) used to trigger interaction between those machines. Thus, for example, a Cisco software IMS product can be used to trigger a VAT port scan by a software product from a different vendor; this interaction might be formatted as a request for a new configuration with a passed argument (in the form of the CCF and translated data). Importantly, the use of plural products of the same type is also contemplated. That is to say, the architecture presented in FIG. 1 permits for example two IMS systems to be used in parallel, each providing respective results. A client administrator can evaluate competing software products (to select one for implementation on a more-long-term basis), or alternatively, can use these products for more sophisticated behavior (e.g., a voting process where two products of the same type are used in parallel to obtain greater sensitivity in detecting attacks and assessing associated threat levels, or to provide for a suite of varied responses depending on the product detecting the threat). Again, the use of a VM platform with translation and broadcasting of events facilitates nearly any type of desired behavior. Note that in addition to or in lieu of automatically invoking a predetermined message type (request for information, notification, request for new configuration, as set out in the attached appendix), other forms of triggers or scripting may also be used depending on embodiment.

Thus, inbound Internet traffic received at proxy site 113 (that is, Internet traffic traveling in the direction of the private network) is passed to one or more virtual machines for processing. FIG. 1 indicates that first virtual machine (VM) 120 is configured to provide IMS services; notably, this VM is depicted in dashed lines to indicate that in this embodiment, an IMS is optionally used to screen all traffic received at the site, prior to normalization of that traffic. Results of using this VM are then normalized by a translation layer 121 and passed to one or more VMs, seen here to include hardware 123 having one or different software products 1-n (numbered 135 in FIG. 1). Note that a VM can include plural applications (e.g., 137, 139) running on a single piece of hardware, a single application (e.g., 141) running on a single piece of hardware, or a single application implemented as multiple virtual machines and running on several pieces of hardware (e.g., 139). Again, each application can be a software product from a different vendor or manufacturer or the same or different type of software product relative to other applications; in FIG. 1, VM 137 is exemplified as an IPS, VM 139 is exemplified as a FWS, and VM 141 is exemplified as a SEMS. In the system of FIG. 1, the translation layer 121 normalizes the inputs and outputs of each VM, in a manner so as to enable a common set of messages representing function calls, scripts, macros, load balancing or other programming to be applied; the results of these functions is one or more messages broadcast to multiple VMs or addressed to a single VM, for example, using a network protocol (e.g., TCPIP). This translated exchange with each VM is identified by reference numeral 127 in FIG. 1. Note that as indicated by box 129, each exchange involves a common communication format (CCF); reaction (including the generation of alerts, reports and other rules or configurations) is indicated by reference numeral 131. Note also that in alternate embodiments, the IMS (and indeed, any number of IMS products) can be implemented as one or more post-normalization VMs, e.g., an IMS can optionally be treated as any other software product, generically represented by numeral 135. Once any required processing has been completed (e.g., processing by the IMS 120 only, and preconfigured or triggered processing by other VMs 133, 135 and/or 137 through the translation layer 121), forwarding circuitry 143 is then used to forward the processed inbound Internet traffic on for distribution through the private network, for example, to various machines (105).

One benefit also provided by the architecture illustrated in FIG. 1 is the ability to easily scale hardware and selected services. To illustrate this point, expansion arrow 133 indicates that the security services can be scaled by adding additional VMs on additional hardware 123 as necessary. In one embodiment, this scaling is automatic; in other embodiments, scaling can be conditioned on administrator approval (e.g., client fee approval), or automatically performed within predefined parameters and requiring approval only once specified milestones are reached. Thus, to illustrate this point, if it is assumed that a specific software product (e.g., a Cisco IPS) can effectively manage up to a predetermined packet rate or number of users, as flow dynamically changes, additional machines can be transparently rolled into service as new configuration requests to handle temporary or long term bandwidth issues. Load balancing can be performed using dedicated machines, although in FIG. 1, it is illustrated as being managed by scripting or other reactive functions, e.g., when flow exceeds an VM maximum, additional VMs are automatically established, with the proxy site 113 or an associated router or IPS automatically configured to reroute messaging to the pertinent VM. Notably, in one embodiment discussed further below, this type of approach facilitates service bureau methods where hosted security can be performed on behalf of a client, and where the client is charged fees on a micropayments basis, e.g., the client pays for each piece of hardware or VM only to the extent (duration and/or flow) consumed. When traffic levels fall below minimums, surplus VMs can be phased out. In an environment where specific, predetermined message types are used, as referenced earlier, this scaling can be automatically provided by new configuration requests, which are checked against any pre-arranged client limits or parameters, and then automatically invoked as new VMs. In a hosted environment, a client administrator can use a secure web portal or other interface to remotely and dynamically change management parameters as needed, for example, by dynamically authorizing additional services and/or VMs (e.g., above pre-configured client limits or parameters, if any).

As mentioned above, Internet traffic inbound to the private network is routed through the proxy site 113 and is forwarded by forwarding circuitry 143. A number of mechanisms exist to ensure that inbound Internet traffic is forwarded by the Internet (e.g., "by the cloud") in this manner. For example, the client can change its public domain name service (DNS) entries to list the proxy site. Alternatively and/or in addition, the outbound Internet traffic coming from the private network 103 can be processed so as to add headers or other fields that will cause any return traffic to go through the proxy site. To provide two examples of this, outbound Internet traffic can be routed to the proxy site 113 and/or other equipment represented by box 111 and a X-Forwarded-For (XFF) process can then be used to direct this traffic outward to the cloud, effectively routing it via paths 117 and 115. A return path is thus inserted into this communication so as to ensure that replies are directed to the proxy site 113. An advantage of this technique is that the private network 103 may choose to have screening employed on outbound traffic, e.g., antivirus screening and/or screening for inappropriate material or access to inappropriate sites, for example, implemented as additional VMs. It is also possible for the edge device 109 of the private network to perform this or a similar insertion and instead direct its outbound traffic via dashed-line route 119, with a return path inserted so as to direct reply communications to the proxy site 113. In the case of email messaging, domain keys (DK) and/or domain keys identified mail (DKIM) message headers may be modified, for example, to insert a value for the proxy site 113 into the "d=" or "i=" headers as appropriate. Analogous techniques exist for other forms of network communications. Again, a specific implementation can be used depending on whether the processes presented in FIG. 1 are employed as part of a single enterprise's security efforts, or are performed on a service bureau basis for multiple clients. Examples of each of these implementations are provided further below, and it is possible to have mixed implementations, e.g., in a service bureau environment, one client's private network can direct its outbound traffic directly to the cloud, while another client's private network may choose to route all outbound traffic through the service bureau network.

Reflecting on the architecture illustrated in FIG. 1, a number of advantages should be apparent. First, the use of a virtual machine architecture, and a normalization and translation process, permits ready and dynamic scaling of software security products and dynamic selection and deselection of those products. A software product may be selected and implemented as a virtual machine in a desired position or posture with other network security services, literally in minutes, with any existing configuration automatically updated to mesh with the newly selected product. The use of a virtual platform permits integration of software products generally without substantial need to modify or otherwise specifically configure the private network 103. A client represented by that private network 103 can thus be assured of having up-to-date security software products, and ability to dynamically switch between products and scale, without having to necessarily pay annual or similar license fees with each release, and without need to pay substantial fees before product performance can be evaluated. Second, while virtual platforms for software are known, the use of translation and, in particular, the use of a common communication format (CCF) using predetermined message types irrespective of security service permits different products with different capabilities (and from different vendors) to be used dynamically and interchangeably. More specifically, an intrusion monitoring system (IMS) can be employed to detect problems, with scripting then used to automatically take preemptive or curative actions using other products, not just specific products, but to classes of products having compatibility types that permit different products to address the same problem in different ways. This interoperability between machines is facilitated using techniques for normalizing data and invoking certain predefined, standard messages, effectively as function calls between machines. Further below, the use of templates and other approaches will be presented to exemplify implementation of these features and related capabilities.

Figure 2A:
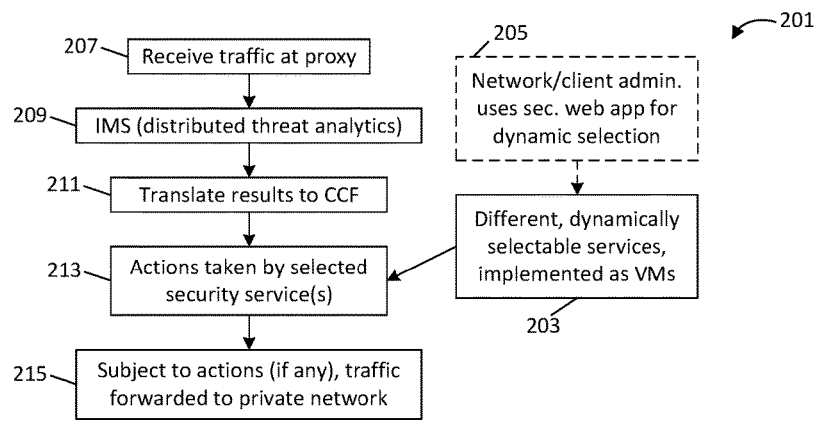
FIG. 2A provides a block diagram used to explain a security method 201 in which different security services (e.g., different types of services, and different vendors' products) are implemented as virtual machines (VMs), and are used to interface with an intrusion monitoring service to provide scalability and adjustable reaction capability.

FIG. 2A is a block diagram used to explain a security method 201 in which different security services (e.g., different types of services, and different vendors' products) are implemented as virtual machines, and are used with an intrusion monitoring service to provide scalability and adjustable reaction capability. Note that as with the embodiment discussed just above, this method permits dynamic selection and deselection of security services for a private network, implemented as respective virtual machines, as indicated by reference numeral 203. Per numeral 205, the selection amongst different selectable services can be optionally performed by a client administrator, for example, via a secure web application.

With services being selected and appropriate VMs being instantiated, traffic is first received at a proxy site, as indicated by reference numeral 207. The traffic is then processed by or otherwise routed (209) to an IMS system, which performs distributed threat analytics on the inbound traffic; traffic is also routed as preconfigured for the private network, e.g., to other VMs for processing as appropriate (see, e.g., FIG. 3C, below). In addition to this preconfigured processing, detected threats or other results from the IMS can be used to trigger conditional functions, for example, scripted commands to another of the VMs, such as for example, to invoke a new rule or policy. To provide one example, relating to conditional "extra" AVS scrutiny, if the IMS system were to detect traffic patterns implying a heightened virus or malware threat, the results of the IMS indicating this fact could be scripted to cause an IPS to route a portion of the inbound traffic to a specific AVS VM. It might be the case that a remote client network already has antivirus capabilities, but in this example, the distributed threat analytics would be used to invoke added AVS scrutiny through a standardized interface based on triggers generated as a result of traffic pattern analysis. Per reference numeral 211, results of the IMS processing are translated to a common communication format (CCF); in one embodiment, these results include a variety of data from the IMS and, in a second embodiment, only alerts from the IMS are translated as events and logged or exchanged between machines using CCF. Note that as will be discussed below, in many implementations, metadata (e.g., a binary record of traffic) can be produced continuously and logged, either the IMS, by scripting, or by a separate VM. Should a threat be detected or other need for action, predetermined message types (i.e., a CCF) can be used to invoke the pertinent VM and associated security service, per numeral 213, relying on these logs (i.e., on the archived metadata) as necessary. Elaborating on this point, reputation can be enhanced by permitting the IMS to query other systems as to whether or not identified metadata represents a threat—thus, short of a detected threat, if supported by the specific IMS, the IMS can issue a "request" for information on a broadcast basis to other services, with arguments being passed using the CCF. Alternatively, if a threat is detected, this information can also be normalized and broadcast to other services using the CCF; that is, using a network communication protocol (e.g. TCPIP), a message can be sent out to all other VMs broadcasting an event, with each recipient service having functionality to modify policies or take corrective actions responsive to the detected threat. Note that the combination of predetermined message types and the use of common network transmission protocols facilitate interaction between different platforms and security products. In addition, the IMS can also issue a request for a new configuration (e.g., a new VM instance corresponding to an existing or new service, within pre-established client authorization limits). This functionality can either be supported natively by the particular security software vendor as an engrained aspect of its products, or it can be effected via an API that sits on top of the IMS (or other VM).

Again, per process 203, each service operating in the desired client network can be arranged in advance as virtual machines, for example, by a client administrator, and can be running in the background or made active by a trigger from the IMS. Depending on the selected service(s) from a pool of available services, the aforementioned message types (or alternatively, a particular pool of scripts and triggers) can be made automatically available to the client based on a capability type which matches a capability type of services selected for use on behalf of the specific private network. These functions can be modified by the system as threats emerge or as software updates or scripting updates otherwise occur. Further examples and detail will be provided further below. As finally denoted by process block 215, subject to the IMS and any pertinent security actions (i.e., functions provided by the additional, selected security service(s) beyond the IMS), traffic is then forwarded on to the private network (e.g., a client network).

Figure 2B:
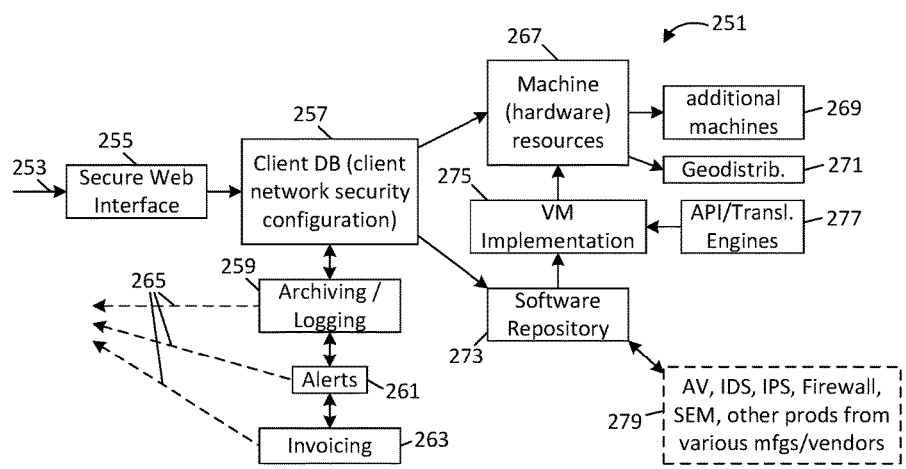
FIG. 2B provides a block diagram 251 of a hosted security architecture, where a client uses a secure web interface 255 to dynamically select (add) and deselect machines and services as virtual machines (VMs).

FIG. 2B is a block diagram used to explain a hosted security method 251, where a client uses a secure web interface 255 to dynamically select (add) and deselect machines and services as virtual machines. More particularly, FIG. 2B is used to explain how services can be hosted for a client network on a managed service or a service bureau basis. Arrow 253 represents access to the secure web interface 255 by a client administrator. The administrator is provided with dynamic capability to select various security software services, which as mentioned, can be different commercial software products running on a virtualized platform. The administrator can also specify bandwidth limits used to provide automatic VM scalability up to a predetermined limit; if the system needs to exceed these limits, the administrator can be alerted, for example, via the secure web interface 255 or via an email alerts or other alter system (generally represented by arrows 265). As the administrator effects changes in services, and/or rules, policies and scripting as desired, these changes are recorded in a client database 257 which represents a record defining the security service configuration for the associated private network, and which also provides a billing record (in the event the security services are provided on a micropayments or "pay-as-you-go" basis). As seen with reference to functional boxes 259, 261 and 263, the implementation stored in the client database is used in defining archiving and logging parameters, alerts, and invoicing. Depending on the network configuration defined by the client record, individual machines (hardware) can be managed (267), with machines being added or removed from use based on the client database record (269) and with machines being used in selected geographies, for example, geographically distributed data centers (271). In this regard, it is noted that one optional automated function (described further below) permits reactive routing of Internet traffic meeting certain parameters to specific machines and/or specific geographies; thus, for example, if a particular network is experiencing a high volume of directed attacks originating from "geography A", as detected by the IMS, it is possible to automatically and dynamically reroute all such traffic to a dummy server located in "geography A," or otherwise to quarantine such traffic through appropriate routing. This capability is enhanced if choices exist to use machine (hardware) resources (267) at different data centers (271).

As indicated, the client database specifies the security services configuration for each specific client, and in this regard, represents a selection amongst multiple, individually selective software products having different capabilities and generally representing different vendors' products (273). Any selected products are each automatically implemented as one or more virtual machines, per reference numeral 275, and can be run in the background or activated as needed, for example, based on IMS requests for new configurations and appropriate translation (277). As noted by dashed-line block 279, the selectable services can generally include AV, IDS, IPS, FWS, SEMS and other types of security products (that is, security products having similar or other capability types).

Figure 3A:
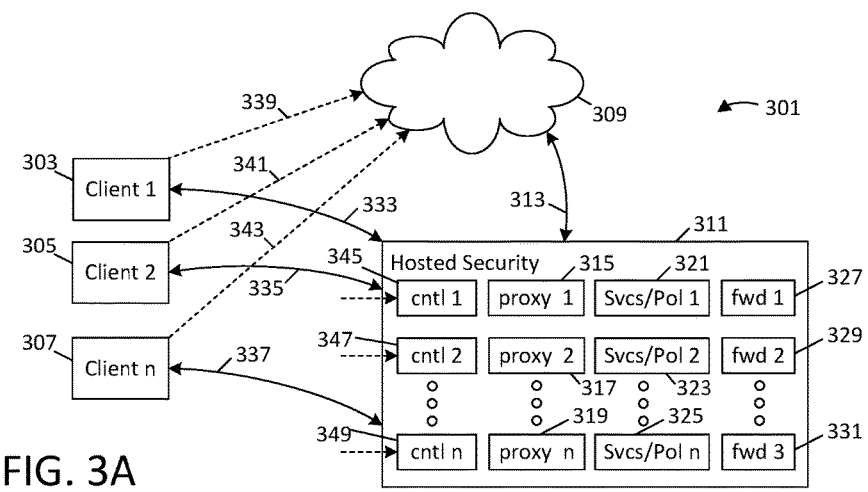
FIG. 3A diagrammatically illustrates a hosted security service (generally designated 311), where a "service bureau" remotely services a diverse set of clients with client-specific resources and services.

FIG. 3A provides a further illustration of a configuration 301 for a hosted security service 311, namely, one that services a diverse set of clients with client-specific resources and services. More particularly, this figure is used to help illustrate a service bureau method, that is, where security services are provided for multiple remote client networks for a fee. In this implementation, it should be assumed that n clients each have respective networks 303, 305, 307 for which the clients wish to procure hosted security services. Once again, a cloud graphic 309 is used to represent a WAN such as the Internet. As was the case before, inbound traffic intended for distribution within the respective client networks 303, 305, 307 is directed to respective proxy sites within the hosted security network. The hosted security service 311 in this case represents a network controlled by the service bureau provider, and thus not only receives traffic from the cloud (as represented by path 313) but is also separated from each of the client networks by the cloud as well, as represented by three respective paths 333, 335 and 337. With security services performed remotely from each of the client networks 303, 305 and 307, it is desired generally to maintain a level of confidence in the post-security processed traffic and, to this effect, each of the paths 333, 335, 337 between the service bureau network 311 and the respective client networks are typically secure paths, for example, a secure tunnel formed as a virtual private network or otherwise using IPSec, SSL or similar processes. Note that these paths 333, 335, 337 all travel across the WAN (e.g., through the Internet or other applicable network) but are shown separately to reflect separate encryption for each client. As with the embodiments discussed above and below, a number of implementation variations exist, e.g., each client network 303, 305, 307 can forward all of its outbound Internet traffic through the service bureau network 311 for relay to ultimate destinations via path 313, or each client network can also simply communicate outbound Internet traffic to the cloud directly, as represented by paths 339, 341, 343, or redirect inbound traffic to the service bureau network 311.

As part of the service bureau network 311, each respective client network 303, 305, 307 is given its own dedicated proxy site or sites, labeled 315, 317 and 319 in FIG. 3A. That is, at least one and potentially any number of sites are given to each respective client for direction of inbound traffic for security processing. Thus, for example, if a hypothetical company "ABCZ, Inc." was to route its traffic through hypothetical service bureau network at "servicebureau.com," ABCZ, Inc. would be given one or more exclusive proxy site addresses within servicebureau.com such as ABCZ.servicebureau.com or ABCZ.US.servicebureau.com, ABCZ.EP.servicebureau.com, and so forth. Clearly, these examples are not meant to be limiting, and any naming methodology can be used. The use of one or more dedicated sites for each client network 303, 305 or 307 permits a unique set of rules and services (e.g., VMs) to be applied to all outbound traffic traveling through that site in accordance with security network configuration for the specific client, e.g., any specified IDS or IMS or other security service can be automatically applied to all received traffic, with unique services, policies, rules and other customizations, separately selected and applied for each client network. This client-specific customization (e.g., by respective administrators) is represented by respective control boxes 321, 323 and 325. While it is optional that outbound traffic from the client network to the cloud also be processed in this manner, it is contemplated that in a typical implementation, a specific client network will choose to have inbound and outbound traffic both processed by the security services network, but in different manners customized to the client through services selection and scripting. Again, an administrator for the specific client network can, using the VM infrastructure introduced earlier, build any desired network protocol using different and dynamically selectable security products, defining an entire security network infrastructure literally within minutes. For outbound web access Internet traffic, a X-Forwarded-For (XFF) process is typically used, for outbound email traffic, a "d=" header based technique is typically used, and for other network traffic, analogous processes are used so as to ensure return path specification to the pertinent proxy site. As depicted by respective sets of forwarding configurations (e.g., circuitry/machines configured to forward inbound traffic to the respective client network 303, 305, 307 using appropriate routing and encryption), once the customized services and processing represented by boxes 321, 323 and 325 have been applied, with any filtering, blocking or other processing applied as appropriate, that remaining inbound traffic which is suitable for forwarding is conveyed to the respective client network.

As introduced above, each client network 303, 305, 307 is optionally provided with a respective secure web interface 345, 347, 349 for dynamically changing services (e.g., tearing down, reconfiguring, adding to or otherwise modifying configurations, including selection and deselection of services and setting automatic bandwidth maximums and minimums). Such a secure web portal is established by well-known web application processes, and typically relies on 2-factor or better security to authenticate an authorized client administrator or administrators acting on behalf of each client network. To provide an example, a particular client could elect to authorize up to a predetermined number of VMs to provide a specific service (e.g., if each VM services up to a maximum number of flows or packets, a client administrator could effectively pre-authorize use of "up to three" machines, with additional bandwidth expansion restricted without further client administrator authorization).

Reflecting on the structure depicted by FIG. 3A, the VM-based architecture and CCF usage introduced earlier permits a single entity (e.g., a service bureau) to provide for-fee or other services on an independent basis for each of multiple client networks (that is, for multiple private networks). A client database (not shown in FIG. 3A) stores amongst other information client security network configuration that allows the hosted security architecture to be uniquely customized for each client using what are effectively fungible resources built from the VM architecture, with translation and normalized/standardized communication between components. Each client can dynamically select and remove services and reconfigure its security functions in real-time, as desired, retrieve metadata, run vulnerability assessment tools, and generate reports. In addition to this dynamic capability, translation and interaction as has previously been described is automatically applied to each system, so as to apply automatically generate communications and apply reactive functions depending on the VM services selected by the pertinent client.

Figure 3B:
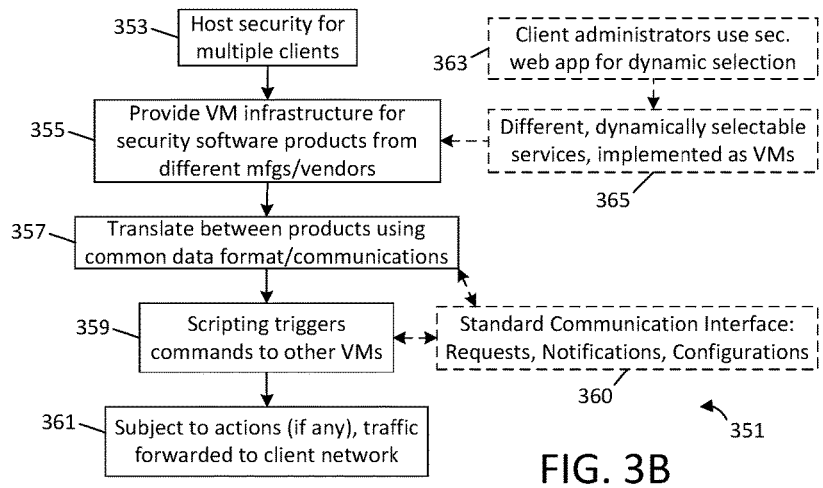
FIG. 3B provides a block diagram of another hosted security method 351, where multiple clients are serviced using respective services suites; each client can independently add and deselect virtual machines (VMs) for automatic interaction via respective secure web interfaces.

This architecture is further illustrated in FIG. 3B, which shows a method 351 where multiple clients each use respective services and policy suites, and where each client can independently add and deselect virtual machines via respective secure web interfaces. As denoted by boxes 353 and 355, a service bureau can host security for multiple clients through its own network, providing a virtual machine (VM) infrastructure for these clients to pick and choose security software products from different manufacturers or vendors. Translation and a common communication format (CCF) are used to permit these products to communicate with each other in their virtualized environment, and use of a limited set of predetermined message types are used to trigger actions responsive to the detected threats, with arguments passed between VMs using the CCF. Subject to any desired processing (e.g., baseline configuration) and any triggered actions responsive to a detected threat, traffic which has been suitably processed or filtered is then forwarded on to the particular client network. These actions are respectively represented by function blocks 357, 359, 360 and 361. As noted above, each client can have a security web service application made available to its proxied administrators, with these administrators dynamically selecting services and building a network configuration as appropriate (363, 365).

Figure 3C:
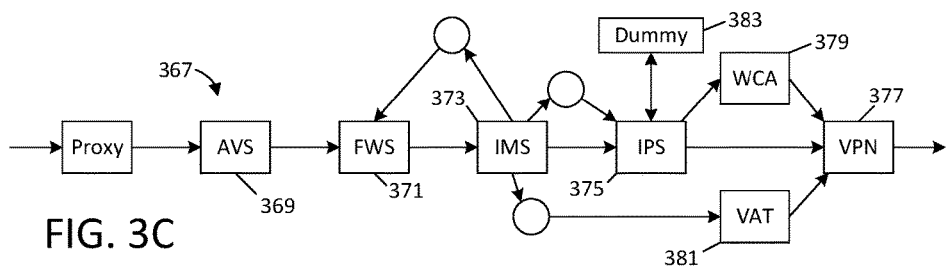
FIG. 3C shows a hypothetical security configuration which can be dynamically defined for a client network.

FIG. 3C provides a hypothetical example of one baseline configuration 367 which could be instantiated by a client. In particular, a graph indicates that a client has built a virtual network consisting in sequence of an antivirus service (AVS) 369, a firewall service (FWS) 371, an intrusion monitoring service (IMS) 373, an intrusion prevention service (IPS) 375 and a VPN forwarding structure 377. The particular client also has elected to have a web cache application (WCA) 379 and a specific vulnerability assessment tool (VAT) 381 conditionally invoked as potential threats are identified, with specific attacks redirected to a dummy machine 383. Each system is built as a virtual machine (VM). In FIG. 3C, round shapes represent automatic communications applied by the system, to invoke or otherwise control conditional actions of others of the VMs in response to detected threats. As should be apparent, this configuration can be specific to the particular client, with other clients electing to have other configurations and fewer or greater resources. Note that the interaction invoked is dependent on the services selected for the particular client, with additional rules and configurations automatically applied on an evolving basis, i.e., as threats are detected. The client can also use its secure web interface to electively add, delete or modify the policies de facto applied by any specific machine 369-383, with configurations, policies and associated metadata for traffic received by the client stored in, or otherwise identified by, the client database. Bandwidth parameters elected by the client are not separately depicted in FIG. 3C.

Note that it was earlier mentioned that a number of different configurations can be used to implement principles discussed above. Some of the contemplated configurations are introduced by examples presented in FIGS. 4A through 4E; other configurations will also be apparent to those having skill in the art.

Figure 4A:
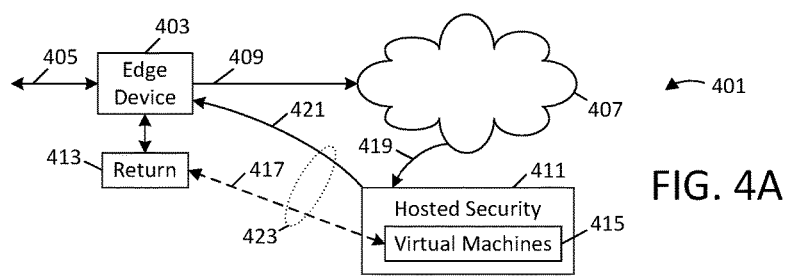
FIG. 4A shows one configuration 401 for a hosted security service 411, where a private network (represented by edge device 403) directs outbound traffic to a wide area network ("WAN," represented by cloud icon 407), but where return traffic and other traffic inbound to the private network is directed to the hosted security service 411.

More particularly, FIG. 4A shows one configuration 401 for a hosted security service 411, where a private network (represented by edge device 403) directs outbound traffic to a wide area network ("WAN," represented by cloud 407), but where traffic from the cloud (including return traffic) is directed to the hosted security service 411. The traffic can come from various sources including messaging, web accesses from the private network to the cloud or vice-versa, FTP transactions and other forms of one or two way exchanges. As introduced above, private network on its end (per box 413) can change its public DNS records to point to a proxy site or sites (not shown in FIG. 4A) within the hosted network 411, and otherwise syncs up inbound Internet traffic with a return destination identifying the proxy sites or sites; the correspondence between the private network's actions and the particular proxy site or sites is represented by path 417. In this particular case, outbound traffic represented by path 405 is forwarded by the edge device to the cloud, as represented by path 409 with any appropriate return path information inserted as appropriate, such that response traffic proceeds via path 419 to the hosted network 411 and the appropriate proxy site therein. As noted by box 415, virtual machines (VMs) have previously been configured to supply baseline processing as well as interact with one another via standardized communications to respond to detected threats. Subject to processing of this traffic by the hosted service, traffic is then forwarded over the Internet to the private network via secure VPN, along route 421. The secure VPN in this case is represented by reference numeral 423. Thus, FIG. 4A identifies a configuration where inbound Internet traffic to the private network is processed by a hosted security service 411, but where the private network on its end manages communications directly with the cloud so that the inbound Internet traffic takes this route. This implementation is advantageous for private networks wishing to process their own outbound traffic, particular where the private network itself wishes to screen outbound traffic, or does not want a third party (such as hosted security service 411) to have visibility into certain information (e.g., personal information) outbound from the private network.

Figure 4B:
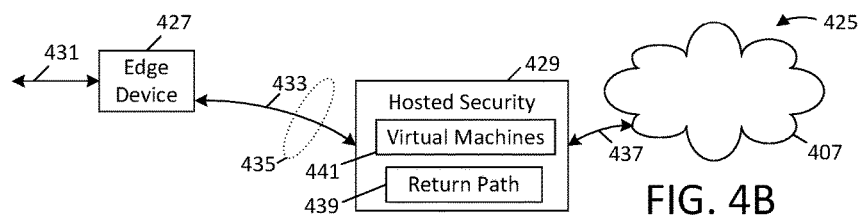
FIG. 4B shows another configuration 425 for a hosted security service 429; in this configuration, a private network (represented by edge device 427) routes all outbound traffic and receives all inbound traffic through hosted security service 429; the hosted security service can optionally at its end modify outbound traffic to insert a return path such that return traffic is directed to the hosted security service for forwarding to the individual private network.

FIG. 4B shows another configuration 425 for another hosted security service 429; in this figure, numerals repeated from FIG. 4A should be assumed to represent like elements. A private network (represented by edge device 427) routes all outbound traffic and receives inbound traffic through hosted security service 429; that is, unlike the embodiment of FIG. 4A, the private network simply routes all outbound Internet traffic out over the Internet to the hosted security service 429 over path 433. As was the case before, the private network also updates its public DNS entries to point inbound web accesses to the proxy site (not shown) within the network of the hosted security service 429. On its end, the hosted security service uses an XFF protocol or other protocol where it effectively specifies a return path (439) on outgoing traffic from the private network and, optionally, the private network can implement VMs (441) that perform outbound traffic processing (e.g., AVS, content screening, blocking of specific destinations and so forth, as has previously been described). The outbound traffic is then routed over path 437 to the cloud 407. Inbound traffic (whether return traffic or otherwise) is processed in the manner indicated above, that is, is received at the proxy site, processed by VMs 441, and forwarded post-security screening over a secure path (path 433 or another path) and then is routed within the private network, as indicated by numeral 431. The secure VPN for at least traffic inbound to the private network from hosted security service 439 is denoted by reference numeral 433. Reflecting on the configuration represented by FIG. 4B, this implementation is advantageous for private networks wishing to outsource security for both inbound and outbound traffic, e.g., the private network can elect to have the hosted security service 429 perform all conventional forms of network security for all external traffic whatsoever.

Figure 4C:
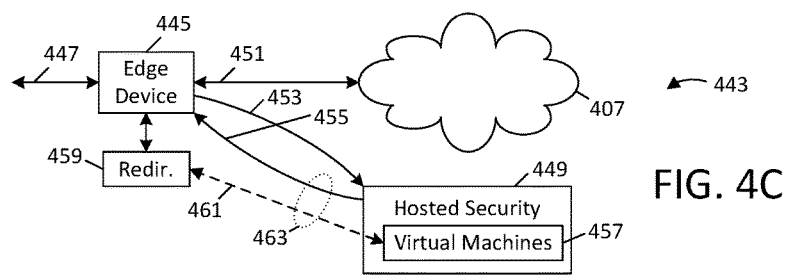
FIG. 4C shows yet another configuration 443 for a hosted security service 449; unlike the configuration of the foregoing FIGS., the private network (represented by edge device 445) itself handles all traffic with the cloud, but redirects inbound traffic (and optionally outbound traffic) to the hosted security service 449 for security processing.

FIG. 4C shows yet another configuration 443 for a hosted security service 449; unlike the foregoing examples, the private network (represented by edge device 445) itself directly handles inbound and outbound traffic with the cloud (via path 451), but itself transparently redirects inbound traffic (and optionally outbound traffic) to the hosted security service 449 for security processing via path 453, and receives return, security-processed traffic from the hosted security service via path 455. This implementation has the advantage that no changes to the private network's DNS names are required, but it does require extra routing and potentially additional infrastructure on the part of the private network. The edge device 445 receives outbound traffic from its network intended for the WAN via path 447 and also distributes screened, inbound traffic along this same path. At least for inbound traffic from the WAN, the edge device 445 redirects that traffic as indicated by box 459. Once again, the private network ensures that its redirect destination corresponds (461) to the address of the desired proxy site (not shown in FIG. 4C). At the hosted security network 459, the redirected traffic is processed by VMs 457. Once screening is completed, filtered traffic is returned to the edge device 445 for routing within the private network. Note that a secure protocol (e.g., VPN, SSL, etc.), denoted by numeral 463, is used at least for "backend" configuration of the security network via path 461 and forwarding of screened traffic back to the edge device 445. Note also that, as contrasted with the implementations mentioned earlier, the scheme represented by FIG. 4C is amenable to completely transparent use of the hosted security service 449, e.g., although separated from the private network by the Internet, the private network can be perceived as both source and destination of the WAN traffic as appropriate, removing or avoiding if desired any externally identifiable indicia that the hosted security service was used. This scheme also presents the advantage that a private network can elect to process some, but not all, of its traffic using the hosted security service. For example, a private network might choose to have external web accesses to its website routed through hosted security service 449, but may choose to internally process employee emails using self-managed antivirus and malware scanning prior to delivering emails to an exchange server. Many variations of a mixed security outsourcing model are possible using the presented frameworks.

Figure 4D:
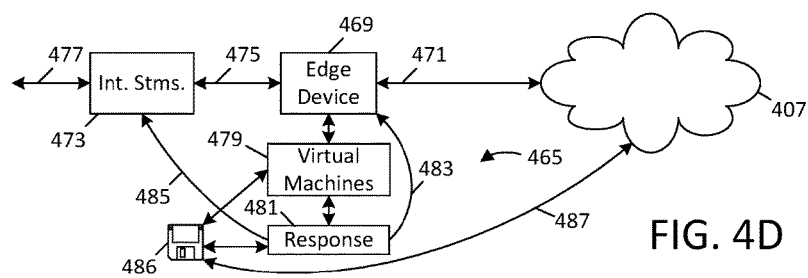
FIG. 4D shows still another configuration 465 for a security service, this time entirely structured within the private network needing security services, and where communication path 471 represents a connection to the public Internet (or another WAN).

FIG. 4D shows still another configuration 465 for a security service, this time entirely structured within a private network, where communication path 471 represents a connection to the public Internet or another WAN. Note that especially in this case, the principles articulated above can be implemented in software entirely within the enterprise (e.g., within the private network), in the form of a commercially-distributed software package or in the form of a custom-built solution. As before, the cloud is represented by numeral 407, with inbound and outbound traffic traveling between an edge device 469 and internal systems 473 within the private network via paths 475 and 477. However, instead of sending traffic outside of the private network for screening, the edge device 469 sends the traffic to internally-hosted VMs 479. These VMs perform client-configured processing as described before, with interaction produced by the VMs (in the form of responses 481, provided over control paths 483 and 485) being used to control the internal systems 473, the edge device 469, or other processes. This operation is like the operations described earlier, but in this case, communications, and data are more easily customized to interact with equipment internal to private network (e.g., that might lie in a separate network from any service bureau); for example, translation and triggers can be interfaced with any conventional private network device, such as for example, routers, secure web apps, load balancers and other equipment internal to the private network. This operation is also possible with a hosted security service (e.g., per FIGS. 4A-C, above), but many private networks may elect to limit control over their own internal systems as a matter of preference. Note that as was the case before, the communications or other scripting used in association with the VMs can include the new creation or configurations of rules or policies with arguments passed using a standardized interface such as with predetermined broadcast message types and data being passed in a common communication format, using a template- or object-based approach for events and data (such as discussed below). Note that the framework for providing this infrastructure, including commercial security products to be implemented as VMs can be provided with underlying code which sets up the virtualization environment for different software apps (e.g., as instructions stored on machine-readable media 486), or can be separately installed via web download or activation, per path 487. It is also possible for the platform for hosting the VMs to be built partially or entirely from scratch within the private network.

Figure 4E:
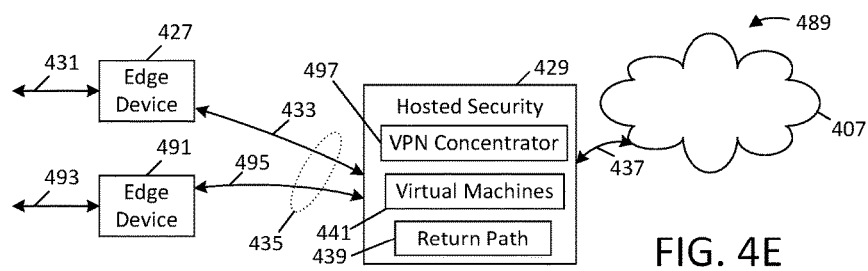
FIG. 4E shows another configuration 489 for a hosted security service, namely, one in which a VPN concentrator 497 consolidates outbound Internet traffic from multiple private networks, again represented by edge devices 427 and 491.

FIG. 4E shows still another configuration 489 for a hosted security service 429, namely, one in which a VPN concentrator 497 consolidates Internet traffic from multiple private network edge devices 427 and 491. This implementation provides a number of benefits for a client wishing to provide remote access to trusted third parties, such as business partners and contractors, each represented as separate private networks, but which are to appear to the outside world as having a common affiliation with the client. For example, edge device 427 might represent the perimeter of a large enterprise (e.g., a large company, or the government), while edge device 491 might represent the perimeter of its contractor; under these circumstances, it may be desired that the large enterprise dictate security requirements for the contractor's sponsored or affiliate web traffic. The implementation is depicted as similar to the implementation seen in FIG. 4B; once again, like numerals represent the same elements as introduced earlier.

In a typical implementation, outgoing traffic from each private network is sent out to the cloud 407 by the hosted security network via path 437, using VMs 441 with channeled DNS and return path treatment (represented by numeral 439). A VPN concentrator 497 is used to support multiple encrypted tunnels for each respective stream of traffic, and can also be used (e.g., in conjunction with other VMs) to route traffic in between the two private networks (e.g., with no processing, or with specific processing relative to traffic involving the cloud 407). Common VPN concentrators (such as from Cisco and other manufacturers) support multiple encryption protocols, and thus, secure communications (represented by numeral 435) can be handled very differently with each private network. This implementation provides a number of advantages for the trusted access model, i.e., different security models can be specified for "direct" trusted access to the client network versus for inbound traffic from the cloud, with each security model built, configured or reconfigured using services dynamically selected by client's proxied administrator.

With the general structure and methods thus presented, this disclosure will now turn to a more detailed discussion of the software architecture of a hosted security service. In particular, FIGS. 5A-7 are used to describe implementation options. Following this discussion, this disclosure will provide some example communications and responses (i.e., examples of automated responses to distributed threat analytics facilitated by the teachings of this disclosure, exemplified by FIGS. 8A-8E); finally, this disclosure will present some commercial application examples (i.e., with reference to FIG. 9).

Design of an Exemplary Hosted Service

FIG. 5A shows a typical client implementation 501 using a hosted security service. In a typical implementation, an administrator proxied by the client builds a default configuration by establishing VM services (as core services, 503) using a client portal 505. That is, the client can log into this portal 505 using a secure web interface to initially select a suite of hardware or software resources, and then can dynamically adjust those resources as conditions warrant, per function block 507. The client typically proxies multiple network administrators for this purpose, e.g., each with at least some authority to define network security parameters. This same group or a different group can also be provided with log access, metadata access and report functions, per block 509. The generated reports can be tailored to different level of abstractions for differed management levels or other reporting purposes, or can provide drill downs for specific VM performance, vulnerabilities, detected threats, load management, or other system parameters. Alerts (511) representing threats in progress (or threats recently resolved)

can be retrieved by administrators via the portal or alternatively can be pushed to the administrators as email alerts (per arrow 513). As noted, configuration changes made via the portal are recorded as part of the client database and are optionally sent to a billing module 515 (e.g., for the case where software is being licensed to the client on a subscription or consumption basis).

Inbound traffic is received at a proxy site associated with a specific client, and default processing is performed on this message, such as for example metadata archiving and basic antivirus and malware scanning, per function blocks 517 and 519. A suite of services selected by the client administrator is then invoked depending on the client specified configuration, for example, as stored as a record in association with the client per block 521; this set of services can include a string of services such as was diagrammatically indicated in FIG. 3C, with each selected service once again being implemented as a virtual machine. Traffic received at the proxy site is routed to VMs in the specified sequence (523) with load monitoring and balancing within any pre-authorized bandwidth limits established by the client record being automatically performed (per numeral 525). As mentioned, this load balancing can be effected by scripting or in other well-known manner.

Numeral 526 depicts the performance of distributed threat analytics. Typically, this is performed by pattern processing the metadata captured and logged earlier in the process, using a correlation engine 528. Any associated results, including any detected threats, are exported, with a translation and normalization (530) being used to convert the results, especially detected threats, to a common data format. Scripting (e.g. macros, per block 531) processes these results to generate triggers 529, which are essentially predetermined commands or rules (i.e., the CCF) which invoke other VMs based on the results generated by the intrusion detection (or monitoring) system, 526. As denoted by block 531, the trigger could, for example, be used to invoke a vulnerability assessment tool using arguments passed by the common communication format. Note that as contrasted with a SEM which might be used to generate an alert or other action, the CCF can be used with plural VMs, i.e., the CCF can be used to broadcast messages (e.g., as a notification) to multiple VMs, with native security product code (i.e., the software product itself) or an API providing reactive capabilities; perhaps otherwise stated, one threat can be used to trigger multiple VMs (with the same or different capabilities), all through preprogrammed (VM) capabilities or through scripting or configuration via the secure web interface. As indicated by FIG. 5A, in one implementation, events are represented a specific template, created and logged in a database using Mongo DB. In one example, if a threat is correlated with a specific source IP address, then upon a determination expressed in the template that the threat is "high," the CCF automatically provides a broadcast message that can be "understood" by a FWS (if implemented); threat processing in general is collectively illustrated by numerals 531 and 533 in FIG. 5A. Importantly, load balancers (535) are applied at each given tier; should a particular service be flooded with traffic, then load monitoring and balancing is applied specific to that service to invoke new VMs as appropriate to maintain throughput (e.g., up to pre-authorized bandwidth limits, per numeral 537). Finally, any remaining traffic which has been processed and determined to not present a threat is forward by forwarding circuitry, per numeral 539, onto the client network.

While FIG. 5A shows one exemplary configuration, a client using the architecture described earlier can build any desired VM infrastructure, with or without an IMS as may be desired by the particular client. In this light, it would be helpful to discuss the event data structure as well as how coding is used to facilitate communication between different VMs, particularly those that implement software from different vendors.

FIG. 5B shows an exemplary layer model 551 to illustrate different levels of code for implementation a security service that permits dynamic selection and deselection of VM services; in particular, respective layers include machine configuration 553, application software implementation 555, the use of objects and templates to provide an event data structure 557, and scripting and web applications which effectuate a normalized communication infrastructure 559. Thus, an entity wishing to build a hosted network infrastructure codes the individual machines (hardware) to serve as a virtual platform for the different, supported software products, and codes the virtualization infrastructure, as represented by reference numeral 553. Layer 555 represents software applications on this infrastructure, in a manner where instances can be created as virtual machines as desired. At a third layer, Mongo DB (or another platform) is used for template generation and data mining using a normalized event data structure. Finally, web application infrastructure and associated APIs and scripting are implemented as a fourth layer, as depicted by box 559, with a standardized interface (i.e., cross VM communication format) being indicated by numeral 560; in one embodiment, this infrastructure relies on code and scripting written in Ruby and Ruby On Rails to implement functions of invoicing, VM configuration, secure web portals, load balancing, automated policy generation responsive to detected threats, and commands between VMs. As mentioned earlier, these communications capabilities can also be retrofitted into existing commercial security software products.

Figure 6A:
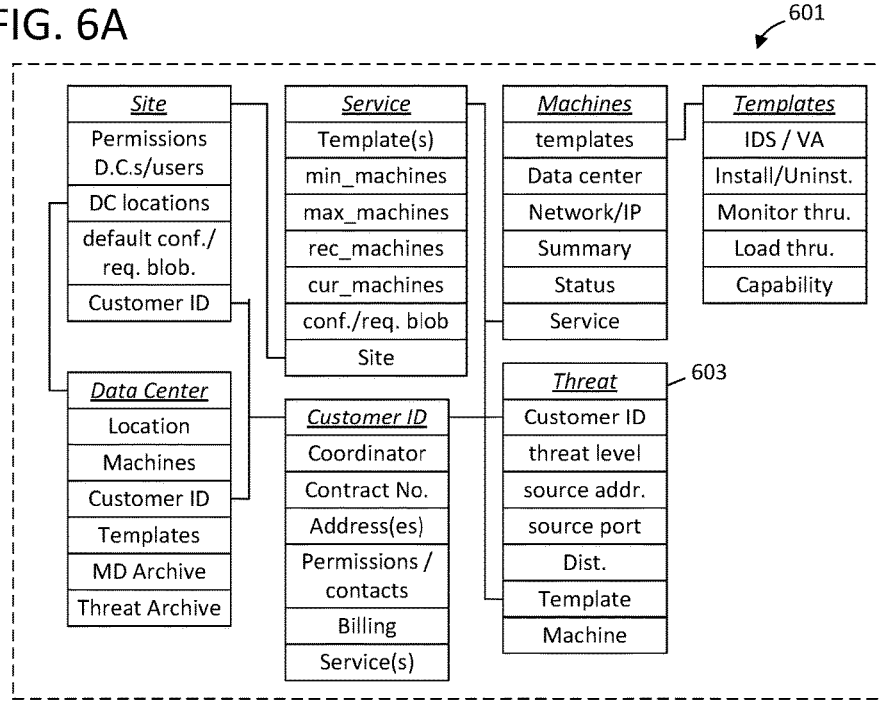
FIG. 6A provides an illustrative diagram 601 showing a template structure that can be used to normalize data exchange and facilitate communication between two or more VMs.

As alluded to earlier, standardized communications and passing of events back and forth can be effected in a number of ways. FIG. 6A is used to illustrate (601) a template-based formed for a security system. The template based format provides a partial means of establishing the various VMs, on a customer-specific basis, for exchanging information representing threats between VMs, and for commanding reactions to detected threats by specific VMs. To provide a specific example, the "threat template," generally designated by reference numeral 603, is used to provide normalized, translated data in this implementation, which identifies specific IMS results determined by the IMS to represent threats. Note that this data format can be used in a number of ways, e.g., it is possible as mentioned above to compare the IMS products of two different competitors to evaluate those products and to effectively provide a reputation service. The template generated by one of these products is substantially identical to the template generated by the other, indicating the template or service producing the threat, the source address and port, the targeted customer, and whether the threat level is gauged at low, medium or high. Note that APIs built in advance as part of the infrastructure and, more specifically, the translation layer, perform any conversions/translation to get to these results. Thus, for example, an IMS from one particular vendor may not natively represent threat levels in this manner, but the translation layer converts data output by the IMS into this type of assessment, to normalize that data and enable the comparison or sophisticated behavior just mentioned. If two IMS systems evaluate the same traffic from the same source to be threats, one determined to be a high threat, the other determined to be low for example, this information could be considered in selecting a long-term IMS product. Alternatively, different sets of policies/scripting could be invoked depending on which vendor's product (i.e., which "Template" in this example) identified the threat as high, and so forth; that is, a high threat level from one IMS product can invoke a first reaction (e.g., reply requests for information, or other form of reaction), while a high threat detected by another IMS product can electively be used to trigger a different response (e.g., from a VM with different capability).

In FIG. 6A, the "services" template identifies a software application, the "machines" template indicates a specific piece of hardware assigned one or more virtual machines and the "templates" template identifies a single instance of a service running on a machine as a single virtual machine. For example, a particular "service" would reflect a specific vendor IDS product (intrusion monitoring product, vulnerability assessment tool, or another type of product). As implied by the template's attributes, each created template identifies current throughput, active status, and whether the specific software instance has a capability to detect specific threats (e.g., malware, denial of service attack, etc), assess specific vulnerability (e.g., port scan or software misconfiguration), block ports and so forth, as represented by an alphanumeric code for the "Capability" attribute. To exemplify usage, if a threat template produced from a specific source (e.g., "template" template) has a specific threshold (e.g., threat>="medium"), then another template (aka an instance of a VM in this example) or a service with a specifically desired capability type can be activated and passed the threat as an argument as a reactive measure; to further elaborate this point, a firewall service (FWS) can step-in in response to a broadcast notification identifying a specific threat, in a manner that all "listening" FWS VMs (or a specific FWS) add the source identified in the provided threat argument to its list of blocked sources.

During configuration, a client administrator adds "services" (which are generally associated with one or more templates) and authorizes minimum and maximum numbers of machines, and as implied by the "site" attribute, can authorize these on a specific site (network) basis. Notably, the "site" and "data center" templates are used to manage equipment at geographically dispersed locations; introducing an example that will be used further below, a hypothetical service might have data centers in the US, in Europe, in Japan (Tokyo) and in Singapore. If attacks against a client are determined to arise from a specific geography, the threat can be used to automatically route traffic from the specific geography to a specific data center, to concentrate and isolate the attack, and prevent it from affecting services (with clean traffic routed to other data centers so as to not be impacted by the attack). A client can have machines at any number of data centers supported by the security services provider, as selected and elected by the client (e.g., for fee), and can install different networks across data centers using the "sites" template. As implied by the name, the "Customer ID" template is linked to a specific customer configuration and is used to identify permissions and perform authentication, and for billing and other purposes.

The foregoing represents one preferred implementation model, but there are other ways that can be used to implement a virtualization architecture as described above. For example, an object-based programming approach can also be used, with both threats and services defined as objects. When a threat object is created, it can be passed in course to a service object for processing and can also be used to, depending on attributes of the object, call or invoke a service (e.g., for specific types of threats). Note that an object-based approach is also represented by FIG. 6A, i.e., the design of objects as threats or services, each object having attributes used for scripting and event translation, is conceptually analogous to templates design and usage. As will be shown below, a relational database can also be used to build a system, although as implied, it is believed the templates-model presented above presents the framework best suited to web application development at the present time.

Figure 6B:
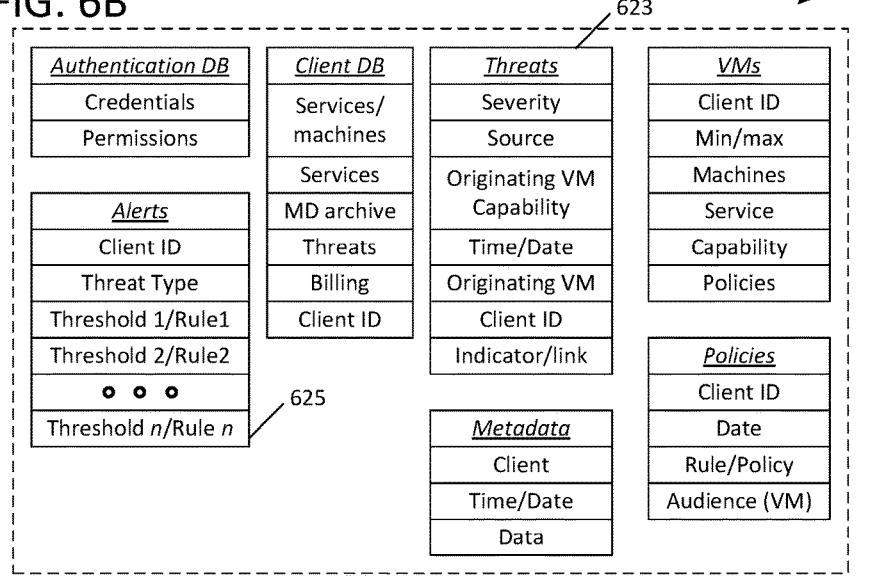
FIG. 6B provides an illustrative diagram 621 showing how a relational database can be implemented in an alternative architecture to provide for data logging and facilitate communication that can be used to pass translated data and otherwise communicate between security applications.

FIG. 6B provides an illustrative diagram 621 showing how a relational database can be implemented in an alternative architecture to provide similar capabilities. In this example a database can be established to log all threats as they occur. This database establishes a de facto data structure that can be used with scripting to invoke specific functions or services. For example, as indicated by numeral 621, the database identifying threats can have a field for originating VM capability, threat severity level, source, originating VM associated client, a link to associated metadata, and other information. If a VM receives a broadcast notification of a threat record from a specific VM, or from a VM matching a specific alphanumeric capability (e.g., from an IMS), another VM can be automatically invoked and passed the specific threat record as an argument. Note that the relational database model can also be used to manage credentials for various clients, generate alerts, identify the client infrastructure, sort metadata, identify VMs, and store policies for specific VMs (e.g., in a manner that can be called up an easily edited by a client administrator). For example, as indicated by an alerts database 625, different thresholds can be used to generate different types of alerts, for example, using different communication mechanisms, provided to different client personnel, or in another manner.

For both FIGS. 6A and 6B, not all possible templates or databases are shown, and it is within the capability of a software designer with experience in these fields to build a translation and normalization model using a template, object or relational database model (e.g., using a model-view-controller architecture) and to rely on a standardized interface for passing communications and arguments back and forth between machines, and generating associated reactions.

FIG. 6C provides another illustrative diagram 641, used to explain how a model-view-controller architecture can be employed to generate communication between machines and otherwise provide reactive capability to detected intrusion or other events. This figure is used to build on the relational DB model introduced with respect to FIG. 6B and to further explain how individual record (or template or object) attributes and fields can be automatically invoked in a reactive manner based on a CCF, e.g., in response to detected threats. Notably, the left side of FIG. 6C provides an example object ("Example Object CEDF") with exemplary fields listed within that object ("severity," "source," "originating VM Capability," "Time/Date," "Originating VM," "Client ID" and "Indicator/link"), the middle of the figure provides some examples of threat levels and VM capabilities that can be used for scripting on a client/specific basis, and the right side of the figure identifies possible scripting (as denoted by the right-side header "macros/scripting"). In a web application embodiment, a templates structure is used and the scripting is advantageously implemented using an open source framework suited for web application development and associated inter-application function calls, such as Ruby and Ruby On Rails. More specifically, as seen in the middle of FIG. 6C, the detected threat level can be used by notification or configuration messages to invoke specific actions, based on an isolated threat record, or based on a voting or other sophisticated behavior (e.g., a rule invoked if two IMS systems separately call out the same the threat). Attention is drawn to box 643, which identifies one framework for identifying device capability (i.e., the type of VM that identified the threat). This field can be used in a number of ways; for example, if the VM which identified the threat (Originating VM) has an "IDS" capability, this argument and the identified threat level can be scripted to invoke configuration of a VAT VM (if the client has elected to use this service) to automatically retrieve linked metadata to identify the destination that the threat was addressed to and run a specific vulnerability assessment scan of the identified destination, e.g., a server configuration scan. The invoked VAT would then be used to automatically provide data back to the client identifying whether or not vulnerability exists, all without human intervention. Note that unlike a SEM product which might be custom-programmed to interlink two sources, the virtualization architecture set forth herein permits any number of products to act in parallel including products of different vendors, and to be dynamically varied—in addition to a VAT for example, scripting for a threat from an "IDS" VM can be evolved automatically or manually updated to additionally invoke a FWS, as has previously been mentioned, to block further traffic from the identified source. As alluded to previously, this capability is not simply dependent upon SEM processing of historical data, i.e., message exchange between machines (e.g., a CCF such as request, notification and configuration messages) can be used to add reputations to possibly threats, to rank threats that align with detected vulnerabilities, or take other actions without awaiting extensive correlation of past data. Note that the use of these functions also requires less data logging; that is, a SEM traditionally might log vast amounts of data; by permitting function calls between different machines, and correlation of SEM patterns with detected vulnerabilities or other VM products, the amount of data processed can be filtered and restricted to events or data meeting specified thresholds, all on a dynamic, reactive basis. The performance of logging ("logging engine", generation of reactive triggers, alerts to clients or to an operator of a security services network) is represented at the right-hand side of FIG. 6C.

It has previously been mentioned that a common communication format (CCF) implements a standardized communication protocol that includes predefined message types that can be understood by each VM in the security network. For example, in one embodiment, by filtering detected events and responsively generating one of a request for information (request), notification (of detected events) or (request for new) configuration, each machine can be made to report events, to query other "listening" VMs (or specific VMs) for confirmation of detected events or threat levels, and to invoke rules, new machines or other reactions to detected events. This functionality as mentioned can be natively supported by different commercial security products or otherwise implemented via an API that sits atop such security products, and it permits different vendors products to speak to one another, to pass arguments (e.g., data) back and forth, and to provide honed results based on threat reputation assessment by dialog with other products. In addition, it can be leveraged to drastically reduce the amount of data processed by the security network, by improving capability of specific VMs to filter data and report and log just those events meeting certain thresholds. The reader is referred to the appendix below, which provides substantial additional detail as to one common communication format (CCF) that can be implemented to achieve these ends.

Figure 7:
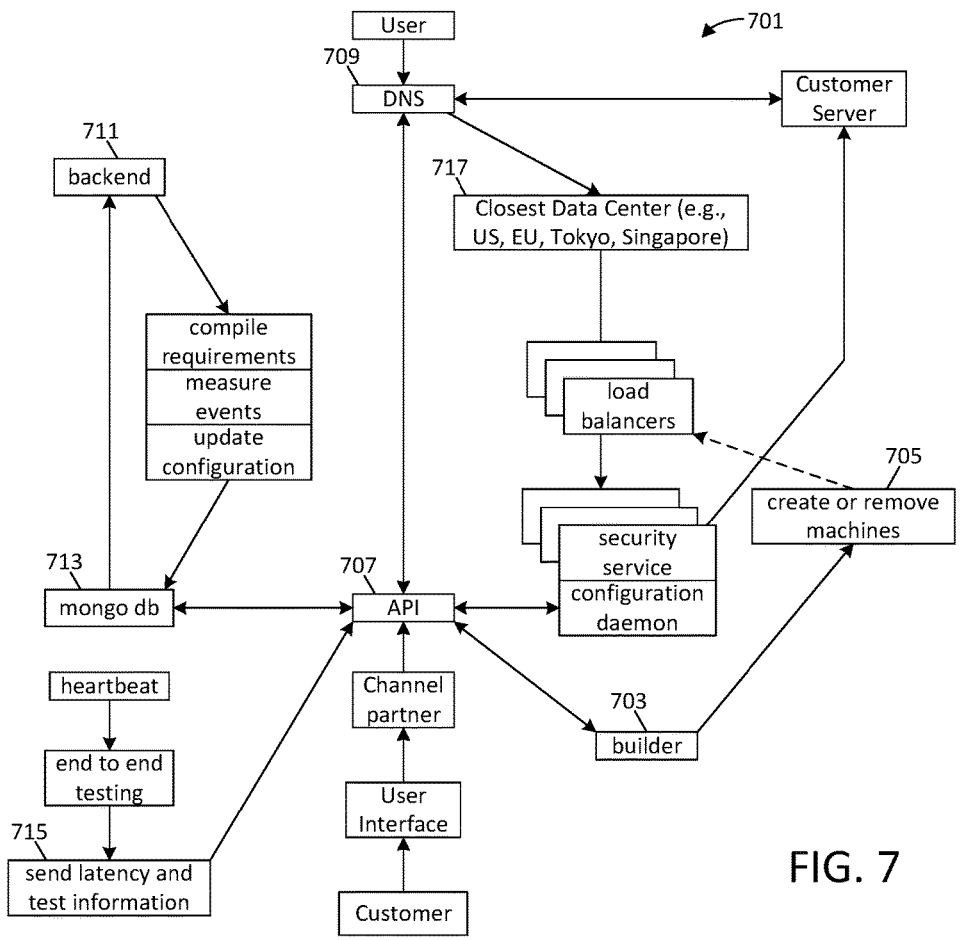
FIG. 7 shows a detailed functional layout 701 of a software design for a hosted security network that provides selective security services on behalf of one or more clients.

FIG. 7 shows a functional layout 701 where each box shows a different software component or module or an associated function associated with the building of a custom security network infrastructure. As indicted by numeral 703, a builder function is provided to a proxied administrator or client to design a custom security network using the VM architecture described above. That administrator initially configures and then dynamically creates or removes machines, per box 705. For example, alerts of a specific type may prompt the administrator to add specific antivirus software—this can also be done ad hoc by the administrator, e.g., to test a newly released product. The newly create VMs are monitored by load balancers within authorized limits, with new VMs configured as additional services, and traffic forwarding to the client network once processing is completed as configured by the administrator (see FIG. 3C). As reflected by numeral 707, the administrator (e.g., for a private network) can set up an API to provide for VPN access to channel partners or customer personnel, as well as secure web access for the purpose of dynamically managing the security configuration, for example, through backend 711. This API is also used to configure the proxy site or sites to which incoming traffic will be directed (and potentially outbound as well) and to update DNS listings (709) as has been described earlier. As represented by numeral 713, in this embodiment, Mongo DB is used as the framework for generating templates representing configurations of the network and also for establishing the CCF (see, e.g., FIG. 6A and the discussion above). Configurations can be tested using Heartbeat, and made available to the client network administrator via API 707. Finally, as alluded to earlier, data centers can be set up in multiple locations—if the security service provider has such locations available, the virtualization infrastructure can advantageously permit the client network administrator to install machines in different geo-locations including any desired proxies as appropriate. Public DNS can then be updated and used to route inbound network traffic to these destinations as appropriate.

Some Example Capabilities.

FIGS. 8A-8F provide some non-limiting examples of scripting that can be used to take specific, automated actions in response to threats detected by the IMS system. While these examples refer to specific capability types (e.g., "IPS"). There are many services that can be configured as VMs using the techniques described above, and that can interact with one another using the framework discussed in this disclosure; for example, as referred to earlier, a web cache application could be another VM type, as could an email authentication module—many such other services exist. The use of an IMS, and other exemplified VM types (e.g., FWS, IPS, VAT, SEM and so forth acting in response) is optional and used for example purposes only. That is, the architecture presented in this disclosure permits any one or more VMs to be elected by a client to interact with any other VM to provide network functions, in manner limited only by the CCF and any associated scripting. The following implementations are provided as non-limiting examples only.

Figure 8A:
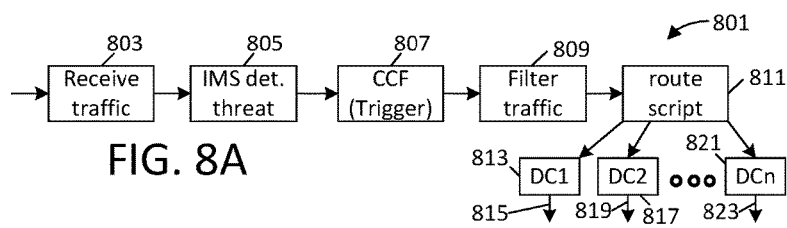
FIG. 8A provides a method diagram 801 used to explain how results provided by an intrusion monitoring system (IMS) can be used to route data.

FIG. 8A provides a method diagram 801 used to explain how results provided by an intrusion monitoring system (IMS) can be used to route data. More specifically, the figure illustrates a scenario where, responsive to a detected threat, traffic is routed to any specific one or ones of a number of data centers (DC1 . . . DCn). The traffic selected for this routing can be traffic representing the threat, or traffic not representing the threat. More particularly, as identified by reference numeral 803, traffic is received at a proxy and forwarded to an IMS for processing (805). The IMS can be implemented as an elective VM service by a network administrator building a customer security network. If the IMS detects a threat, a broadcast message (e.g., a trigger) is generated (807), relying on translated data to identify the threat and reactive scripting that will be used to invoke one or more actions using VMs in response to the threat. As indicated by this example, it should be assumed that a detected threat is such that it is desired to segregate traffic by filtering (809), with scripting used to route some traffic to a first data center (813) and other traffic to one or more other data centers (817, 821). Traffic processed by the respective data centers can then be forwarded on, as represented by arrows 815, 819 and 823. Thus, in a hypothetical situation introduced earlier, if an attack against a client network is being mounted from a specific country, it is possible to route that traffic to the data center closest to it (e.g., DC1, 813), while routing other traffic to other data centers (e.g., DC2 . . . DCn, represented by numerals 817 and 821). If the IMS-detected attack is a denial of service attack, for example, attacks are automatically concentrated in data center DC1 without affecting the rest of the network, while the performance of the other data centers (DC2 . . . DCn) is improved by not being subject to these attacks. Clearly, many variations of this example exist, not necessarily involving threats, e.g., if a high volume of legitimate traffic arises from a particular geography, it is possible to distribute this traffic across different geographies using these techniques, e.g., for load balancing purposes; alternatively, a web caching service can be dynamically applied (e.g., if the traffic relates to media transfer, for example). Again, many variations on this basic model exist, some which do not use an IMS, which route traffic to specific geolocations and configure VMs based on dynamic observations.

Figure 8B:
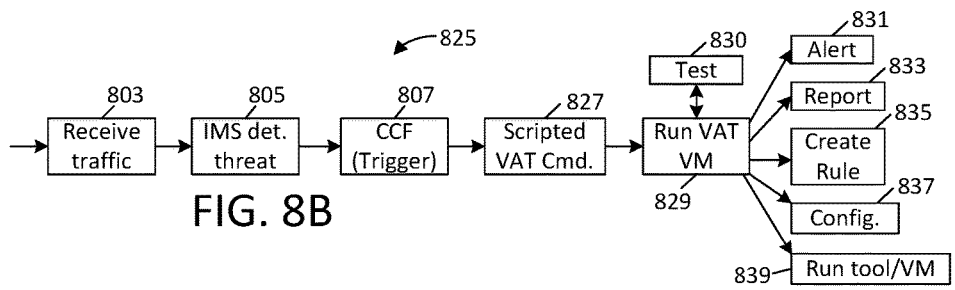
FIG. 8B provides a method diagram 825 used to explain how results provided by an IMS can generate triggers which lead to automatic execution of a function by a vulnerability assessment tool (VAT).

FIG. 8B provides a method diagram 825 used to explain how results provided by an IMS can generate triggers which lead to automatic execution of vulnerability assessment tools (VATs). In this example, like numerals represent the same functions introduced by FIG. 8A. That is, as indicated by numeral 803, traffic can once again be received and screened by an IMS system (805), with a CCF message being generated (807), based on a detected threat. In this example, it is assumed that the particular private network administrator for which security services are provided has elected VAT services, such that a VAT VM is activated automatically, responsive to the detected threat. A predetermined command, for example a request for a new configuration, per function box 827, activates the VAT (e.g., to perform a specific port scan or other testing of the private network)— these functions are represented by boxes 829 and 830. Note that there can be number of results that, if desired, can be scripted to also result from this process. For example, the VAT VM and/or the detected threat can be used to generate an alert to the private network administrator that a specific port or server misconfiguration should be corrected, to automatically generate a report, to automatically create new policies or rules (e.g., for a FWS or a IPS), to perform a system reconfiguration or create a new VM (e.g., an FWS where none existed before), run a tool, or take other types of actions. These functions are variously represented in FIG. 8B by numerals 831, 833, 835, 837 and 839, and, again, many variations and alternatives exist.

Figure 8C:
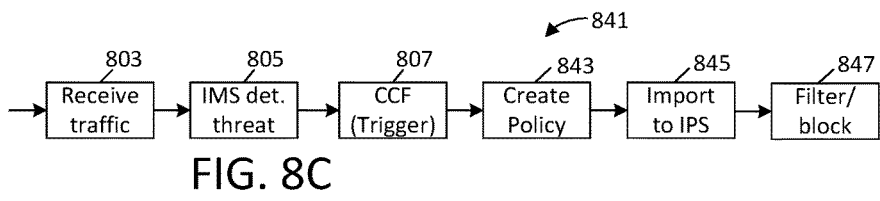
FIG. 8C provides a method diagram 841 used to explain how results provided by an IMS can generate triggers which lead to automatic execution of a function by an intrusion prevention system (IPS).

FIG. 8C provides a method diagram 841 used to explain how results provided by an IMS can be used in conjunction with an intrusion prevention system (IPS). In particular, upon receiving a trigger (807), the IPS can be triggered to create a new policy, for example, to process, filter or block traffic in a specific way (e.g. per numerals 843, 845 and 847). For example, if a network attack is detected as arising from specific country, the IPS can be configured to block all traffic arising from that country, or to implement a specific antispam filter, or to perform an additional level of authentication (e.g., DKIM "strict" hashing and authentication parameters, differentially treat traffic based on hashing algorithm used, and so forth), and so forth. An IPS generally, depending on specific product, can be used to invoke qualitative judgments that express different confidence levels, and different routing and treatment, based on sophisticated analysis of the traffic of the traffic in question.

Figure 8D:
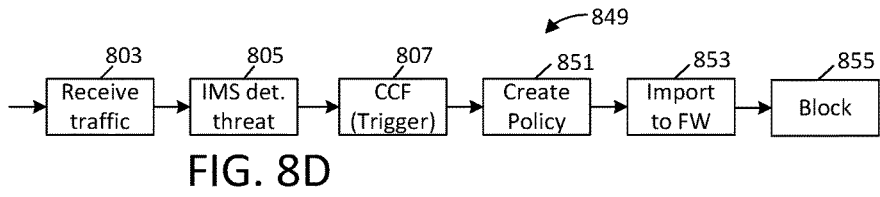
FIG. 8D provides a method diagram 849 used to explain how results provided by an IMS can generate triggers which lead to automatic execution of a function by a firewall service (FWS).

FIG. 8D provides a method diagram 849 used to explain how results provided by an IMS can be used in conjunction with a firewall service (FWS). This method is similar to the last one presented, except that instead of the more sophisticated treatment afforded by an IPS, the FWS is used to on a message-by-message basis block traffic matching specific parameters, for example, based on originating IP address. As before, a CCF (807) can be used to create a policy or rule (851), which then is imported into the FWS and used to block inbound traffic as appropriate (853, 855).

Figure 8E:
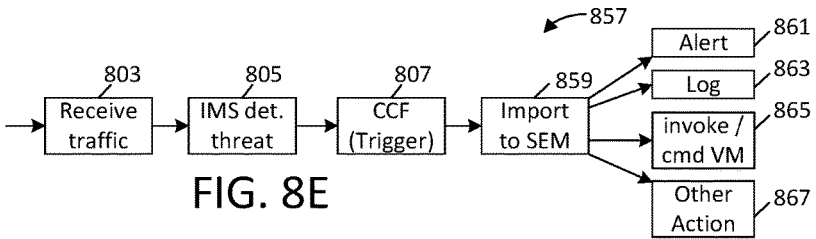
FIG. 8E provides a method diagram 857 used to explain how results provided by an IMS can generate triggers which lead to automatic execution of a function by a security event manager (SEM) service.

FIG. 8E provides a method diagram 857 used to explain how results provided by an IMS can be used with a security event manager (SEM) service. As mentioned earlier, some SEM products generate alerts or other specific actions as a consequence of detected threats. In this case, a specific SEM product can be invoked as a virtual machine, with dynamic communications exchanged with the SEM using a translated data and requests for information, and scripts used to take actions dependent on the output of the SEM; for example, a specific SEM can be invoked to generate a specific action and/or alert, return ranked threats or indications of permissive or scrutinized patterns of network access, to log only certain types of data, to invoke preconfigured actions by one or more other VMs, or to take another type of action, all as represented by numerals 861, 863, 865, and 867.

Figure 8F:
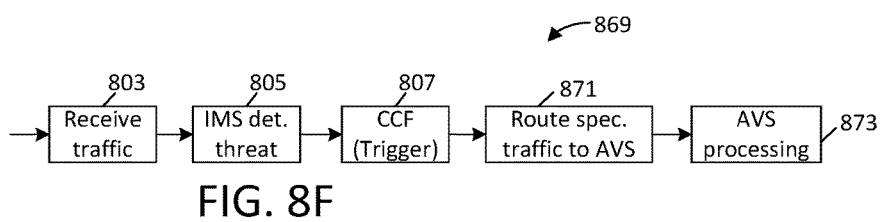
FIG. 8F provides a method diagram 869 used to explain how results provided by an IMS can generate triggers which lead to automatic execution of a function by an antivirus service (AVS).

Finally, FIG. 8F provides a method diagram 869 showing how a CCF (807) can be used in conjunction with an AVS service. In this case, it should be assumed that the detected threat has been tied to a perceived source of a specific virus, malware, or similar problem. Thus, the CCF (807) can be used to establish a new configuration redirect specific traffic (871) to an AVS set up as a specific VM. The specific AVS product for example can perform specialized or enhanced screening (873).

Commercialization And Business Models

FIG. 9 is used to explain different allocations of responsibility, depending on implementation, and to explain some differing business models. A general architecture is represented by numeral 901, with the architecture divided into three horizontal partitions (separated by dividing lines 903 and 905), to indicate different locations where various software components or responsibility can be implemented. First, a leftmost partition represents software and/or modules that can be installed on a client network in some implementations, generally represented by reference numeral 906. A middle partition represents functions that would typically be installed on the security services network. Note that as indicated earlier, for some embodiments, the functions of these two partitions can optionally be combined and implemented in one and the same network (e.g., the network of a large company or entity which provides its own security). Core functions (907) typically include the virtualization architecture discussed above. Finally, the rightmost partition identifies software and functions that can optionally reside outside of the service provider network, e.g., either in the hands of the service provider or a trusted business partner to the security service, i.e., that provides select services collateral to those of the security services provider.

As for the client network, once again, configuration is left in the hands of a client administrator; the client network ideally supports infrastructure for establishing a secure tunnel with the security service for configuration, management and backend actions as appropriate. This functionality is represented generally by reference numeral 909. In implementations that do not involve a web interface, the client network can be provided with a client module or specialized software that allows it to perform remote configuration and interaction; this software and its installation and control over a machine (i.e., a computer) is symbolized by icons 915 and 917 in FIG. 9. Note that if the virtualization architecture is to be distributed as a commercial software product, with or without software security products of various vendors, then this software product is also part of the machine readable media (denoted by disc icon 917, although the machine readable media may be any form of memory, e.g., DRAM in a server). As mentioned, in one model, the virtualization infrastructure can be distributed as commercial software, with a software user then electively downloading individual security applications as desired. The client network also supports any desired routing or configuration of its infrastructure (e.g., to route outbound Internet traffic to the security services network, per the examples of FIGS. 4A and 4B, to change DNS entries for inbound traffic, and so forth), and for traffic encryption and authentication. Some or all of these capabilities can be provided to the private network in question, as mentioned, as a software product 917. As denoted by ellipses 918, client responsibilities identified by the left partition is typically replicated at least partially for each client or private network supported by the core functions 907.

The middle partition of FIG. 9 is associated with the security services network. The associated responsibilities include providing the core functions (including VM support) 907, infrastructure for routing and communication with each private network receiving security services 919, and encryption and authentication (including VPN tunneling) services 921. In addition, the security services network can also include modules to handle payment for third party software licenses and other costs, and to invoice its clients receiving security services, per numerals 923 and 927. For example, it was previously mentioned that one contemplated business model supports a micropayments form of licensing, where client networks are invoiced on a "pay-as-you go" basis, i.e., just for those third party software products that are used and just for the duration or volume of use. To provide one example, depending on the license fee structure utilized, a client installing and operating a specific IPS "for one day" can be invoiced for 1 day's use only, or on another abbreviated basis; the virtualization model is such that the client need not extensively configure its own internal systems to meet the requirements associated with the specific "IPS," and equally important, if the client decides to instead use another product, the client can elect to deactivate the associated VM without incurring annual license subscriptions or copy purchase costs; similarly, should the particular software vendor distribute a newer version replacement software, the security services provider can update its offering in a manner where the client is billed based on use, and thus, pays little if any for the upgrade. Naturally, other license fee or subscription models can also be used, e.g., a client network can be charged, without limitation, a flat fee, a monthly fee, an annual fee, a per service flat, monthly or annual fee, or on some other basis. The software that implements and supports these various functions, and the machine or machines that the software controls, are collectively represented using icons 929 and 930.

Note that the network of the security service provider communicates with different entities; (a) multiple clients, represented by the left partition, each one of which has one or more of the responsibilities represented by numerals 906, 911, 913 and 915, and (b) one or more third party entities such as services providers to the service bureau, represented by the right partition, such as software licensors and regulatory authorities; these entities are represented by numerals 931, 932 and 935.

Elaborating on structure that can be outsourced or run as a complementary service to the security services network, the outsourcing of data center management provides a first example, 931. If a third party provides this support, the license payments function of the service provider network includes payment functions as appropriate to compensate the data center providers, e.g., these payments if desired can be tracked and invoiced to the account of the client network they are used to support. Similarly, if per-use or per-client software fees are paid to individual software vendors, then license payments (and support as necessary) are provided to (and from) these entities, as represented by numeral 932; note that a trusted link can be established for this purpose, e.g., to provide visibility and messaging access to support personnel. Other subscriptions and the optional outsourcing of client billing (e.g., for security services received) is represented by numeral 933; again, such entities can be provided with trusted access, such as incremental billing information for each private network receiving security services. Generally speaking, any number of service providers to the security services network can be meshed with the security services network as represented by continuation arrow 941. If necessary, the security services provider network can also provide these third parties with access into the security services provider network, for audit, accountability or other purposes.

A special case is presented by boxes 925 and 935, labeled "regulatory." For some fields of endeavor, particularly when dealing with health and safety, national security and financial administration, information possessed by the client network can be tightly regulated by governmental authority. Therefore, if warranted by the implementation and the specific business model, a third party entity (e.g., a regulatory agency, such as an agency of the government) can be provided with partial or complete visibility into the security and security networks of specific clients. For example, newer generations of laws provide for tight control over patient privacy and access to health records; depending on client business and the WAN traffic at issue, it may be desired under some circumstances to provide regulatory authorities with trusted, direct access to the private network, as well as to metadata, security configurations, records of client administrator services selection and other dynamic actions, and to other data, for accountability, national security, and other purposes.

Note that software modules to support any of the above interactions can be provided to these latter entities, as depicted by software and machine readable media icons 937 and 939; generally speaking, these modules support authentication and "trusted partner" connectively, to enable or facilitate electronic interactions with the security services provider, as described above.

CONCLUSION

It should be appreciated that by providing a flexible virtualization architecture that can support network security software products in any desired configuration, this disclosure provides specific examples of system, methods, services and software that greatly enhance network security. For example, this disclosure enables network security to be customized on a dynamic, individualized basis for each of multiple clients, e.g., via a common service bureau. These techniques can be extended to any private network, or hosted security for any private network, as well as commercial software products. Further, the teachings provided by this disclosure are not limited to intrusion monitoring and reaction, but are applicable to other network and machine applications.

What has been described is a set of methods, software and systems design to implement network security services with a flexible architecture. Other applications will readily occur to those who design electronics or software in view of the teachings provided above, or in view of the invention defined by the claims set forth below. For example, while description above has focused on a template-based (or object-based or relational database) implementation for virtualization and translation, other techniques are also possible. Furthermore, while many of the examples presented above are rooted in intrusion monitoring and response, other applications also exist.

Accordingly, the foregoing discussion is intended to be illustrative only; other designs, uses, alternatives, modifications and improvements are also possible which are nonetheless within the scope of the present disclosure, which is limited and defined only by the following claims and equivalents thereto.

APPENDIX

The appendix set forth below constitutes a part of this disclosure and is incorporated by reference. It provides additional detail regarding one non-limiting example of a common communication format (CCF) and means for promoting dialog between multiple services (e.g., different security software products or products of different vendors).

APPENDIX

Vorstack Security Protocol
Introduction

The Vorstack Security Protocol is an implementation reference (standard) to achieve high-speed normalization[1] and correlation of security events. The Security Protocol works across multiple security elements and is vendor-agnostic. This document includes a description of data notification, subscription, data normalization, and data formatting for interchangeability.

[1] The processing of data to avoid redundancies

Data Formatting

Data formatting is enforced in the Security Protocol. Unstructured text is converted into normalized feeds prior to interacting with the Security Protocol.

Data Normalization

One desirable benefit that follows data formatting is data normalization. Each security vendor has various fields that the standard enables sharing with. Most of these fields are well-known and follow industry conventions. Security vendors can modify fields to enable interaction with other vendors to best leverage the capabilities of the Vorstack Security Protocol.

Data Schema V2 (Draft)

This is the current V1 schema that security vendors comply with when communicating via the Vorstack Security Protocol. V2 is in currently under construction and will enhance capabilities without significant changes required by most security vendors.

Group: [Job Management]

| Key Name | Data Type | Description |
| --- | --- | --- |
| job_id | String | Unique Job ID Generated by the backend to Cluster and distribute work load across systems. This key is assigned by the API. |
| dispatcher_id | String | Distributed Dispatcher ID for internal clustering of jobs. Assigned, managed and accessible on a per security product basis. |
| customer_id | String | Reference to customer ID |
| site_id | String | Reference to site the security products are configured |
| service_id | String | Reference to the specific security product/service |
| machine_id | String | Reference to the specific machine receiving and or executing the request |
| Status | String | Job status ('queued', 'started', 'failed', 'completed') |
| created_at | String | When the job was created |
| updated_at | String | When the job was last updated |
| progress | Integer | Progress in percent |
| count_total | Integer | Number of objects in this job |
| count_current | Integer | Number of objects completed in this job |

Group: [All IP Communications]

| Key Name | Data Type | Description |
| --- | --- | --- |
| src_mac | String | Source NIC/MAC Address |
| dst_mac | String | Destination NIC/MAC Address |
| src_ipaddr | String | Source IPv4/IPv6 Address |
| dst_ipaddr | String | Destination IPv4/IPv6 Address |
| proto | Integer | Protocol (TCP, UDP, Other) |
| src_port | Integer | Source Port |
| dst_port | Integer | Destination Port |

Group: [Threats]

| Key Name | Data Type | Description |
| --- | --- | --- |
| signature | String | Unique Signature Hash for the Threat |
| name | String | Short hand name of the Threat |
| description | String | Long description of the Threat |
| tags | Array | Associated keywords with Threat |
| references | Hash | CVE, BID, Other with URL mapping as second value |
| metadata | Hash | Vendor Specific Envelope |
| session | Array | Reference numbers to PCAPs for replay capability. |
| discovered_at | Timestamp | When the Threat was discovered |

Group: [Configuration and Global Information Access]

| Resource | Key Name | Data Type | Description |
| --- | --- | --- | --- |
| /machine/ | machine_id | String | Information about machines built by the infrastructure and their current state |
| /service/ | service_id | String | Information about security product, related machines and product configuration |

| Resource | Key Name | Data Type | Description |
|---|---|---|---|
| /site/ | site_id | String | Information about site, list of security products and geo location preferences |
| /customer/ | customer_id | String | Information about customer |
| /jobs/ | job_id | String | All requested jobs queued by the customer |

Data and Information Flow

Figure 10A:
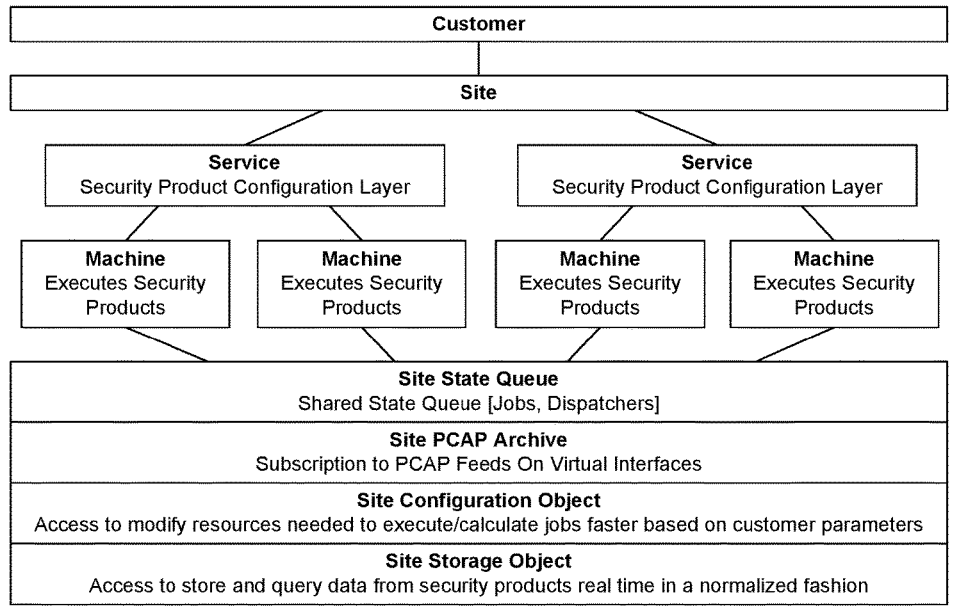
FIG. 10A is a diagram associated with data and information flow described in the accompanying Appendix.

See FIG. 10A.

The process starts with the service provider creating a site that contains one or multiple services for a customer. The services contain multiple virtual machines to execute the security products the customer has requested. Security elements become site members.

Each security element that becomes a member of a site has access to a few key shared resources:

State Queue
    Job and Dispatcher Management, by reference in the table above: "Job Management".

Site PCAP Archive
    For any systems utilizing PCAP files, such as IDS systems, a continuous feed of 2 MB chunked PCAPs are stored using GridFS. This allows for subscription and playback to the machines without having to capture the data twice.

Site Configuration Object
    If at any point in time, the service (or customer) requires architecture modifications to execute a task, these may happen real time within any given site.

Site Storage Object
    Site Storage Object allows for storage of threats, IP communications (i.e. netflow like data) as well as any future information covered in the Data Schema. The storage object also provides a queryable interface for real time lookups.

State Queue

One element of the Platform (API and backend) is automatic data distribution, load balancing and failover. This especially advantageous when deployed in Public Cloud or other type of high-speed, on-demand environments.

The platform has two modules:

Global Jobs Assignment (reference: "Job Management" group.)
    Jobs are always assigned by the customer and noted in a standard that allows for data splitting.
        Example #1: A /24 Network can be turned into 256 sub-dispatcher jobs for individual scans.
        Example #2: URLs can be pre-crawled to calculate the index prior to performing heavy-weight application scanning.
        Example #3: Discovery (Nmap) can be done prior to performing VA and thereby automatically tune the VA scanners.

Jobs are always synchronized with the global API, allowing the reporting of progress between dispatchers [individual services and subtasks] without having to go into much detail.

Dispatchers and Resource Management
    Dispatchers are resources/chunks of one. The jobs section always calculates the progress, counts and status based on the dispatchers.

One benefit of this platform is its capabilities with regard to load balancing.

The following programmatic statement can be utilized in the backend load calculation:

```
while (
    (NUMBER_OF_JOBS_QUEUED /
    NUMBER_OF_MACHINES_RUNNING_REQUESTED_SECURITY_PRODUCT)
    >=
    (RECOMMENDED_VENDOR_STANDARD||CUSTOMER_SET_VALUE)
    {
        add_security_product( );
    }
```

In non-pseudo-code, each vendor can state the maximum number of jobs/items in queue before a new, fresh machine is added to help with the workload.

PCAP Archive

Job management works well for distributing one time tasks, but products requiring bandwidth analysis present a much greater challenge. The PCAP Archive interface helps address these issues.

Figure 10B:
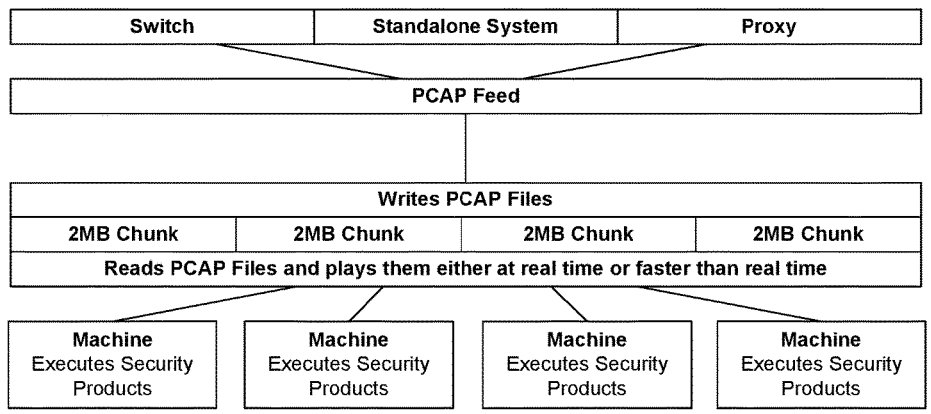
FIG. 10B is a diagram associated with a PCAP Archive described in the accompanying Appendix.

See FIG. 10B.

Configuration Object

Backend configuration is effected through the REST API, though abstracted using the local libraries that are present on the machines.

Most services do not care about the configuration API except for user interface purposes. The backend calculates the job and dispatcher resources for the vendor. If a vendor wishes to forcefully change the service definitions for a particular customer, for example to remediate identified vulnerabilties, it is accomplished by using the REST table described in "Configuration and Global Information Access." Note the 'service' which gives access to all parameters for the current customers site/service(s) installation, as well as gives access to modifications.

Key Value Storage Object

The key value storage object is based on a NoSQL with a soon to be memcache layer for hot-queries. It allows for a quick if not-cached return false response methodology to allow for real time queries, as well as delayed writes. Interfacing with the system is abstracted again using the normalization and correlation libraries to allow for zero-configuration and scaling.

Indexed Blob Storage Object

For storage of large binary blobs, such as PCAP archives, a GlusterFS backend is used. The recommended setup for per data center is minimum 10 Gbit (Ethernet), but preferred setup is using direct access Infiniband 40 Gbit switched to avoid backend peaks. The blobs are stored using a directory hierarchy layer following a basic ID with multi index symlinking methodology as shown in the diagram below.

| | |
|---|---|
| /data | Base directory for all mount points |
| /data/site_id | Mount point for data sharing between machines within the same site_id |
| /data/site_id/machine_id | Directory in use for a specific machine within the site_id mount point. |
| /data/site_id/machine_id/pcap | Generic storage container to store binary data. Named 'pcap' in example to store pcap files |
| /data/site_id/machine_id/pcap/all | Sub directory containing all entries in a day-subfoldered directory (to avoid running out of inodes). |
| /data/site_id/machine_id/pcap/tags | Reserved directory for creating indexes by symlinking to files. |
| /data/site_id/machine_id/pap/tags/hello world | Directory name symbolizing tags. Symbolic links are added to files to create rotational indices. |

Searches are done either by performing a full read (slow) of all the files, or by creating 'tags' similar to how a map reduce method on large computational files. Reading all the content, pre-processing it and then linking it to appropriate tags for then to cross-correlate on the tags only for very fast lookups. These lookups can also be loaded into a memcache layer which reduces query time to <1 ms.

VORSTACK API

Introduction

The API is designed to automate the building and management of resources based on results originating from the Vorstack Security Protocol. The overall implementation is referenced in "Security Framework" for implementation details. The main use case for the API are separation and controlled access to configuration data between customers implementing the architecture. It also gives a single, unified method for configuring, deploying and scaling hardware resources for underlying security products.

API Definitions

Figure 10C:
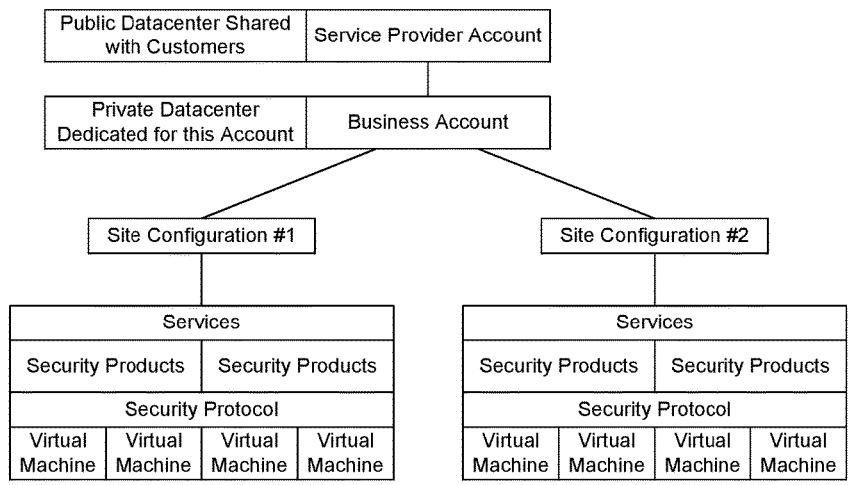
FIG. 10C is a diagram associated with API definitions described in the accompanying Appendix.

The API is based on a pull and push hybrid mechanism. Any participating security product, known collectively in this architecture as "services", provide features based on templates ("security product definitions defined in a bootstrap format"), under a customer site definition. See FIG. 10C for the full flow chart of all relations.

Concepts:

Service Provider Account
  Has access to other accounts and encryption keys to temporarily decrypt data/view events.
  Access to reconfigure architecture to enable/disable services based on customer integration methodology.
  Ability to share hardware resources and products to customers based on ownership, such as security services and datacenters.

Business Account
  End customer with access to his own data only.
  Can be restricted to not allow provisioning of new security products; thereby only giving query/reporting capabilities.

Site Objects
  A walled encrypted container containing one or more security services for the customer allowing multiple security products to share and store data.
  One site may not share data outside its container unless it follows the anonymization methods.

Service Objects
  A security product rendered as a service speaking the security protocol and configuration bootstrap methodology as defined in the templates.

Template Objects [not in diagram]
  Standard methods for installation and bootstrapping a security product to get it to a default installation. All machines (virtual and non-virtual) are built on templates, and then configured using the vorstack-daemon (referenced in the Vorstack Security Framework).

API Schema [V2] (Draft)
  Accepts: text/json
  Authentication: HTTP-Basic-Auth (API/Key Combination)
  Standard REST Interface for all Systems (see table below)

| HTTP | PATH | Response | Description |
|---|---|---|---|
| GET | /resource | Lists objects | Lists short hand all available objects for a given resource. Example GET/customer returns a short hand list of all customers the current account has access to. Most searches are filterable by appending the search terms as query parameters. |
| GET | /resource/OBJECT_ID | Show one object | Shows detailed information about OBJECT_ID. |
| DELETE | /resource/OBJECT_ID | Delete one object | Deletes the resource OBJECT_OD. |
| POST | /resource | Creates a new object | Uses parameters in hash 'resource' to create a new resource. |
| PUT | /resource/OBJECT_ID | Updates an existing object | Uses parameters in hash 'resource' to update existing resource known as 'OBJECT_ID'. |

Overview of the interfaces (as mentioned in the Security Protocol)

Group: [Configuration and Global Information Access]

| Resource | Key Name | Data Type | Description |
|---|---|---|---|
| /machine/ | machine_id | String | Information about machines built by the infrastructure and their current state |
| /service/ | service_id | String | Information about security product, related machines and product configuration |
| /site/ | site_id | String | Information about site, list of security products and geo location preferences |
| /customer/ | customer_id | String | Information about customer |
| /jobs/ | job_id | String | All requested jobs queued by the customer |

Customer Interface (/Customer)

| Key Name | Data Type | Description |
|---|---|---|
| id | ObjectId | Unique Customer ID |
| customer_id | ObjectId | Customer ID that owns this customer |
| phone1 | String | Primary Phone # |
| phone2 | String | Secondary Phone # |
| address1 | String | Address Field 1 |
| address2 | String | Address Field 2 |
| city | String | City |
| state | String | State (US Only) |
| zipcode | String | Zipcode |
| country_code2 | String | Two Letter ISO-Country Code |
| api_key | String | Unique API Key for Customer |
| account | Integer | 0 (Root), 1 (Provider), 2 (Business) |

Site Interface (/Site)

| Key Name | Data Type | Description |
| --- | --- | --- |
| id | ObjectId | Unique Site ID |
| customer_id | ObjectId | Customer ID that owns the site |
| name | String | Name of Site |
| config | Hash | Default Configuration for Security Products on Site Level |

Service Interface (/Service)

| Key Name | Data Type | Description |
| --- | --- | --- |
| id | ObjectId | Unique Service ID |
| customer_id | ObjectId | Customer ID that owns the service |
| hostname | String | Hostname of the Service |
| site_id | ObjectId | Site ID that the Service is associated with. |
| template_id | ObjectId | Template ID that the service is associated with. |
| config | Hash | Product Configuration made by the customer. |
| minimum_service | Integer | Minimum number of security products needed to power the site. |
| recommended_service | Integer | Calculated, recommended number of security products needed to handle the traffic/jobs for the site. |
| maximum_service | Integer | Maximum number of security product instances the customer will allow/has paid for. |
| serial | Integer | Incremental serial monitoring changes and triggering system updates on host systems. |
| avg_usage | Hash | Summarized data of all usage between participating security products (CPU, Disk, # Threats) |

Machine Interface (/Machine)

| Key Name | Data Type | Description |
| --- | --- | --- |
| id | ObjectId | Unique Service ID |
| customer_id | ObjectId | Customer ID that owns the service |
| provider_id | ObjectId | Named Service ID of the Datacenter that the machine resides. |
| template_id | ObjectId | Template ID that the service is associated with. |
| external_id | ObjectId | Asset ID Mapping to external Virtualization Software (i.e. OpenStack or VMWare) |
| api_key | String | Unique Machine API Key to interact with the API with dropped privileges on site level. |
| ipv4_external | String | External [public] IPv4 Address |
| ipv4_internal | String | Internal [private] IPv4 Address |
| ipv6_external | String | External [public] IPv6 Address |
| ipv6_internal | String | Internal [private] IPv6 Address |
| queue | String | Builder Queue Status ('empty', 'wait', 'run') |
| status | String | down, up, create, destroy |
| machine_id | String | Machine ID temporarily managing this machine, (i.e. updates) |
| ssh_private | String | SSH Private Key (Used for Site-Site Push) |
| ssh_public | String | SSH Public Key (Used for Site-Site Push) |

Note on SSH Keys: After creation of the SSH keys on the virtual machines, all machines delete their private key and the API becomes the custodian. This to allow for further protection/implementation planned for subsequent versions.

Vorstack Security Framework

Introduction

The Vorstack Security Framework ("VSF") is built to enable a streamlined installation, integration, numbering schema and layout for customers wanting to deploy one or multiple services on hardware appliances or virtual machines.

Each piece of software that has integrated the normalization and correlation libraries is contained within its own domain, completely normalizing and bridging the interactions between network interfaces, storage devices and computing power.

In this section:
Components, Flow Terminology
Deployment and Template Methodology
Integration Methodology
Network Capture and Replay Methodology
Node Computation and Hardware Clustering
IP Numbering and Geographical Location Awareness Components, Flow and Terminology As mentioned, the VSF streamlines tasks to get a customer running with security products. To achieve this, there are a few key components ensuring the overall system states:

Vorstack-Dc ("Vorstack Datacenter Appliance Package")

vorstack-dc is a self-contained package that allows for self-clustering and completely redundant builds of data centers. vorstack-dc utilizes KVM for virtualization and interacts with the API to provide baseline (empty OS images) for the implementation of the vorstack-daemon.

Vorstack-Builder ("Vorstack Builder")

Virtual machine image that extends the vorstack-dc machine build capabilities into Public Clouds (Rackspace and EC2 are currently supported). Other systems that support APIs can be added easily. All machines that interface through vorstack-builder are added as dedicated "datacenters" inside their respective providers. For example, to add a Rackspace builder a single RPM is installed in Rackspace.

Vorstack-Daemon ("Vorstack Operating System Daemon")

The vorstack-daemon is a single daemon that runs on a machine (virtual or non-virtual). It is the only package installed onto a clean machine running a specific operating system. It communicates back to the central API requesting template information as defined by the security vendor. The template (as described in "Deployment and Templating Methodology") describes which sub-packages are required to power the machine and process the security requests, as well as any configuration changes required from the baseline operating system image.

Vorstack-Service ("Vorstack Security Product Service")

The Vorstack Service allows for easy access to all Security Product interfaces, including correlation of events and on the fly resource reconfiguration in a unified API. All product integrations are written as a part of the vorstack-service with a plugin methodology.

Figure 10D:
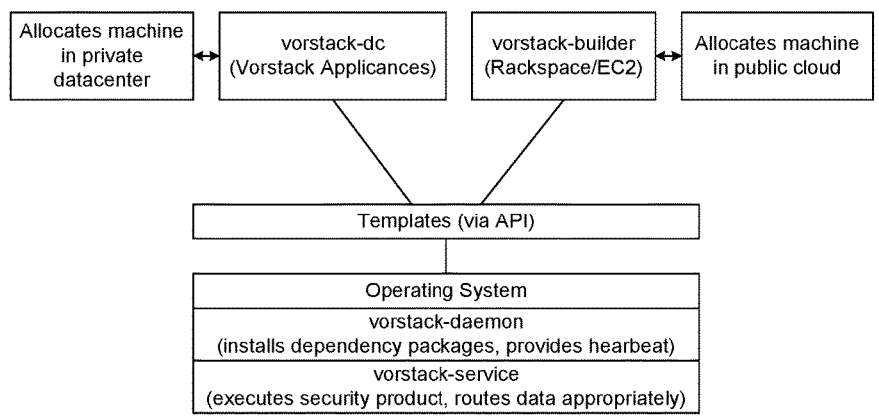
FIG. 10D is a diagram associated with Components, Flow and Technology described in the accompanying Appendix.

See FIG. 10D.

Deployment and Template Methodology

For templating purposes, components focussed on below are the vorstack-daemon and vorstack-service.

Vorstack-Daemon Integration

The following fields are associated with vorstack-daemon integration:

Note: The intended state is 'product installed but not running'.

Alternative #1:
Name of baseline operating system and distribution.
List of all required sub-dependencies outside the baseline operating system.

Alternative #2:
Precompiled distribution (VMDK, QCOW, ISO) with the operating system and software installed but not running.

Vorstack-Service

Note: This section will have some examples, but is not exhaustive as it varies from vendor to vendor.

A standard library is accessible on all machines deployed through the infrastructure. On Linux and UNIX based systems, the packages are available under/opt/vorstack-service/. We support both command line interaction, as well as full library based integration using Ruby.

Note: The key difference between VorstackSp and VorstackDb is how they interface with the data, and how they respond to the events. VorstackDb will compute using MapReduce across the database clustered backend, while VorstackSp caches the responses in memory allowing for a <1 ms response.

Querying Real Time Event Data

VorstackSp.all(:dst_port=>80, :dst_ipv4=>'aa.bb.cc.dd')

Returns all cached elements for port 80, and destination IPv4 'aa.bb.cc.dd'.

Querying Historical Event Data

VorstackDb.all(:src_port=>80, :limit=>10)

Returns all cached elements for port 80, limited to 10 entries.

VorstackDb.create(:dst_port=>80, :dst_ipv4=>'aa.bb.cc.dd', :name=>'Web Attack', :signature=>'my signature')

Stores a new event that can now be picked up for querying using the real-time and historical methods.

Figure 10E:
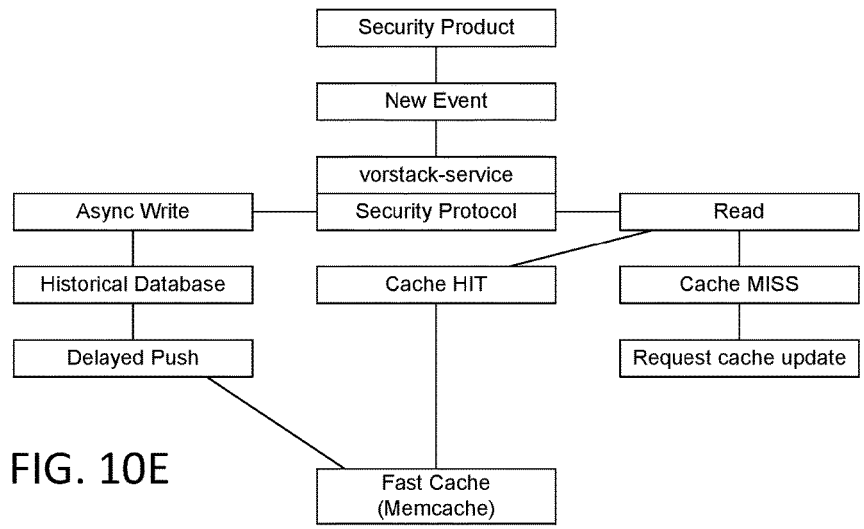
FIG. 10E is a diagram associated with Deployment and Template Methodology described in the accompanying Appendix.

See FIG. 10E.

Integration Methodology

All site containers are completely individual networks, based on existing customer configurations. Benefits of having security products both virtualized and contained include sharing network flow data, automatic IP assignment and scaling, among others.

The application supports three main methods of integration with end customers:

TCP/UDP Level Proxying/NATing

By terminating the session at a virtual load balancer and redirecting traffic into the infrastructure, services can dynamically be added and removed from the traffic flow. This methodology works well for highly dynamic Public Cloud environments.

IP-IP Encapsulation (with or without IPSec)

By configuring a virtual router inside the infrastructure, some or all networks may be routed through the security infrastructure. The connection to the security infrastructure may be encrypted using IPSec, thus leveraging standards for encryption while being transported over the Internet.

Appliance/Ethernet

For datacenters built locally on customer networks using vorstack-dc, or using the Ethernet port, a pure Ethernet connection may be leveraged. This is best suited for critical implementations with stringent requirements for data storage and analytics.

Figure 10F:
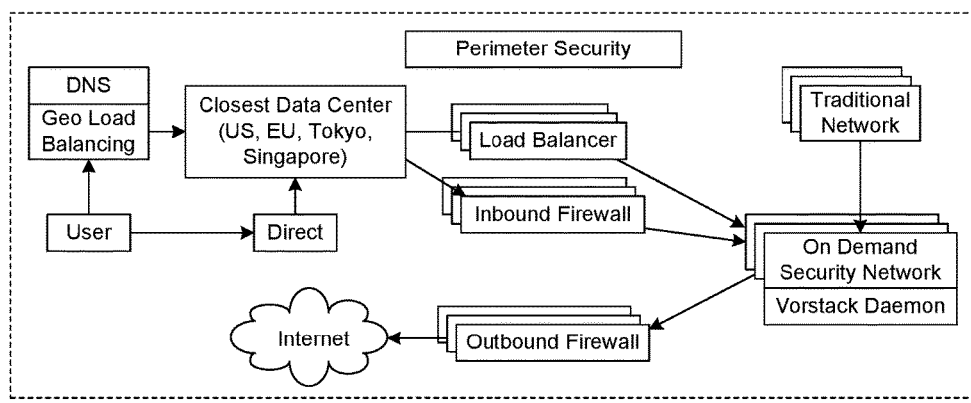
FIG. 10F is a diagram associated with Integration Methodology described in the accompanying Appendix.

See FIG. 10F.

Network Capture and Replay Methodology [Draft]

A significant benefit of a shared security infrastructure is the ability to store, rewind and replay pcap traffic flow. The following interface is therefore provided within the integrated security products:

Command: vorstack-service pcap vorstack0 subscribe realtime

Subscribes real-time to the PCAP streams to the current service configuration.

Command: vorstack-service pcap interface vorstack0 unsubscribe realtime

Subscribes real-time to the PCAP streams to the current service configuration.

Command: vorstack-service pcap interface vorstack0 playback timestamp1 timestamp2

Plays back all pcaps between timestamp1 and timestamp2 as fast as possible on the virtual interface.

Node Computation and Hardware Clustering

This section describes best practices for achieving clustering on the platform.

As defined earlier, all machines have a structured file system with paths relating to their site, service and individual machine.

A recommended practice is to store configuration data related to product management in the API (i.e. firewall rulesets, signature configuration, etc), and running state on the shared paths.

Data Type and Store Areas

| Data Type | Store Type | Path |
| --- | --- | --- |
| Product Configuration | API | /service |
| Shared Product State | Filesystem | /data/service_id/ |
| Events and Logs | Security Protocol | |

The /service object is interfaced on the API side for scaling purposes. Avg_data enables the instrumentation of on-going security element performance. Capacity can be increased by changing the minimum_service/maximum_service in real-time.

Geographical Location Awareness

All assets in the configuration database are tagged with location data, allowing them to find each other based on the closest and fastest route. In example, a data center in Norway that requires IDS but doesn't have it available, can send its data over a virtual interface to a datacenter in the UK.

Some specific thoughts on data management within the product integration that are touched on here:

Data Abstraction

All data interfaces including network and storage are completely abstracted to allow for dynamic re-allocation to another part of the world if necessary.

Async Writes

If the data is being transported across the world due to a local failure, the write times will go down. Hence we use async writes to ensure that speed is not a problem.

Routing and IP Reputation

As customers are routed around the world, and or consume resources from random clouds, they may also exit out from random IP addresses around the world. This means that they inherit the IP address reputation from these clouds. This is why we also support private clouds to allow for a firm reputation building.

Failover Capabilities

Cloud environments are both hostile and prone to small but frequent failures. Our solution is meant to failover in less than five minutes for a complete datacenter, hence we require products to look equal in multiple datacenters to have that capability.

I claim:

1. A system, comprising:
a proxy site to receive Internet traffic for a client network;
intrusion monitoring circuitry to analyze the Internet traffic received at the proxy site to detect a threat using distributed threats analytics;
circuitry that implements at least one selective additional security service from a plurality of different security services, each security service as a respective virtual machine, wherein each respective virtual machine is a virtual platform that emulates an instruction set and enables scalability of the plurality of different security services;
a translation layer coupling the intrusion monitoring circuitry and each selected additional security service, in a manner where the at least one additional selected security service is automatically responsive to the intrusion monitoring circuitry;
forwarding circuitry to forward at least part of the Internet traffic to the client network, subject to performance of a function of the at least one selected additional security service, the forwarding circuitry comprising a device at each data center of at least two data centers that are geographically separated; and
a hardware platform that implements, as a virtual machine, a service to route at least a portion of the Internet traffic received at the proxy site to a receiving device at a selective one of the at least two data centers;
wherein:
the at least one additional selected security service includes an antivirus service;
the translation layer generates a template responsive to a trigger from the intrusion monitoring circuitry representing a detected threat;
the forwarding circuitry automatically, responsive to the template, forward at least a portion of the Internet traffic received at the proxy site to the virtual machine implementing the antivirus service;
the antivirus service automatically screens the at least a portion of the Internet traffic for viruses to produce screened traffic; and
the forwarding circuitry forwards the screened traffic to the client network.

2. The system of claim 1, wherein the first additional security is selected, for use with Internet traffic for the client network, from a plurality of different available security services that are each implemented as a virtual machine.

3. The system of claim 2, comprising:
a web interface that permits a client administrator to dynamically select from among the plurality of different available security services.

4. The system of claim 2, wherein the plurality of different available security services includes security software products from different software manufacturers.

5. The system of claim 1, wherein the intrusion monitoring circuitry comprises code to extract metadata from the Internet traffic and a correlation engine to correlate metadata from diverse exchanges represented by the Internet traffic received at the proxy site.

6. The system of claim 1, wherein the translation layer generates a template for each threat detected by the intrusion monitoring circuitry.

7. The system of claim 1, wherein:
the at least one additional selected security service includes a vulnerability assessment service;
the translation layer generates a template responsive to a trigger from the intrusion monitoring circuitry representing a detected threat; and
the vulnerability assessment service automatically, responsive to the template, tests the client network for a vulnerability matching the detected threat.

8. The system of claim 1, wherein:
the at least one additional selected security service includes a firewall service;
the translation layer automatically generates a policy responsive to a trigger from the intrusion monitoring circuitry representing a detected threat; and
the firewall service controls the forwarding circuitry to implement the policy and consequently block at least some of the Internet traffic from the client network.

9. The system of claim 1, wherein:
the first additional security includes an intrusion prevention service;
the translation layer generates a template responsive to a trigger from the intrusion monitoring circuitry representing a detected threat; and
the intrusion prevention service automatically filters the Internet traffic received at the proxy site in dependence on the template.

10. The system of claim 1, wherein:
the at least one additional selected security service includes a security event manager service;
the translation layer generates a template responsive to a trigger from the intrusion monitoring circuitry representing a detected threat; and
where the security event manager service automatically, in response to the template, (a) alerts an administrator for the client network and (b) logs the template.

11. The system of claim 1, wherein the intrusion monitoring circuitry is implemented as a virtual machine.

12. The system of claim 1, wherein:
the Internet traffic is inbound Internet traffic and includes return traffic responsive to outbound Internet traffic from the client network;
the system is also to receive the outbound Internet traffic from the client network; and
the system further comprises circuitry to specify a return path in the outbound Internet traffic to direct the return traffic to the proxy site.

13. The system of claim 12, comprising:
a virtual private network concentrator to concentrate the outbound Internet traffic that is received from multiple client sites into a single path.

14. A tangible, non-transitory, machine-readable medium, comprising machine-readable instructions that, when executed by one or more processors, cause the one or more processors to:
receive, via a proxy site, Internet traffic of a client network;
analyze, via intrusion monitoring circuitry, the Internet traffic to detect a threat using distributed threat analytics;
implement, via circuitry, at least one selective additional security service from a plurality of different security services, each security service as a respective virtual machine, wherein each respective virtual machine is a virtual platform that emulates an instruction set and enables scalability of the plurality of different security services;

forward, via forwarding circuitry, at least part of the Internet traffic to the client network subject to performance of a function of the at least one selected additional security service, the forwarding circuitry comprising a device at each data center of at least two data centers that are geographic ally separated; and implement, via a hardware platform, a service as a virtual machine to route at least a portion of the Internet traffic received at the proxy site to a receiving device at a selective one of the at least two data centers;

wherein:

wherein a translation layer is coupled to the intrusion monitoring circuitry and each selected additional security service in a manner where the at least one additional selected security service is automatically responsive to the intrusion monitoring circuitry;

the at least one additional selected security service includes an antivirus service;

the translation layer generates a template responsive to a trigger from the intrusion monitoring circuitry representing a detected threat;

the forwarding circuitry automatically, responsive to the template, forwards at least a portion of the Internet traffic received at the proxy site to the virtual machine implementing the antivirus service;

the antivirus service automatically screens the at least a portion of the Internet traffic for viruses to produce screened traffic; and the forwarding circuitry forwards the screened traffic to the client network.

15. The machine-readable medium of claim 14, comprising machine-readable instructions that, when executed by the one or more processors, cause the one or more processors to:

extract metadata from the Internet traffic and correlate metadata from diverse exchanges represented by the Internet traffic received at the proxy site.

16. The machine-readable medium of claim 14, comprising machine-readable instructions that, when executed by the one or more processors, cause the one or more processors to:

generate a template for each threat detected by the intrusion monitoring circuitry.

17. The machine-readable medium of claim 14, comprising machine-readable instructions that, when executed by the one or more processors, cause the one or more processors to:

generate a template responsive to a trigger representing a detected threat; and automatically, responsive to the template, test the client network for a vulnerability matching the detected threat.

18. The machine-readable medium of claim 14, comprising machine-readable instructions that, when executed by the one or more processors, cause the one or more processors to:

automatically generate a policy responsive to a trigger from the intrusion monitoring circuitry representing a detected threat; and control the forwarding circuitry to implement the policy and consequently block at least some of the Internet traffic from the client network.

19. The machine-readable medium of claim 14, comprising machine-readable instructions that, when executed by the one or more processors, cause the one or more processors to:

generate a template responsive to a trigger representing a detected threat; and automatically filter the Internet traffic received at the proxy site in dependence on the template.

20. The machine-readable medium of claim 14, comprising machine-readable instructions that, when executed by the one or more processors, cause the one or more processors to:

generate a template responsive to a trigger representing a detected threat; and automatically, in response to the template, (a) alert an administrator for the client network and (b) log the template.

21. The machine-readable medium of claim 14, comprising machine-readable instructions that, when executed by the one or more processors, cause the one or more processors to:

implement the intrusion monitoring circuitry as a virtual machine.

* * * * *